United States Patent
Takeda et al.

(10) Patent No.: US 10,154,262 B2
(45) Date of Patent: Dec. 11, 2018

(54) IMAGE PROCESSING APPARATUS AND IMAGE PROCESSING METHOD USING IMPROVED PREDICTIVE ENCODING TECHNIQUES

(71) Applicant: CANON KABUSHIKI KAISHA, Tokyo (JP)

(72) Inventors: Eishi Takeda, Tokyo (JP); Yushi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 15/138,639

(22) Filed: Apr. 26, 2016

(65) Prior Publication Data

US 2016/0323582 A1 Nov. 3, 2016

(30) Foreign Application Priority Data

Apr. 28, 2015 (JP) ................. 2015-092370

(51) Int. Cl.
*G06K 9/00* (2006.01)
*H04N 19/124* (2014.01)
(Continued)

(52) U.S. Cl.
CPC ......... *H04N 19/124* (2014.11); *H04N 19/103* (2014.11); *H04N 19/146* (2014.11); *H04N 19/176* (2014.11); *H04N 19/50* (2014.11)

(58) Field of Classification Search
CPC .... H04N 19/176; H04N 19/124; H04N 19/91; H04N 19/463; H04N 13/0048; H04N 13/20021; G06T 9/007
See application file for complete search history.

(56) References Cited

U.S. PATENT DOCUMENTS 5,778,339 A * 7/1998 Sonohara ............ G10L 19/0212
                                                            704/200.1
5,949,956 A   9/1999 Fukuda
(Continued)

FOREIGN PATENT DOCUMENTS

JP        2010-004514 A      1/2010

OTHER PUBLICATIONS

Office Action dated Apr. 6, 2018, which is not enclosed, that issued in a related U.S. Appl. No. 15/139,008.
(Continued)

*Primary Examiner* — Eueng-Nan Yeh
(74) *Attorney, Agent, or Firm* — Cowan, Liebowitz & Latman, P.C.

(57) ABSTRACT

An image processing apparatus comprising an acquiring unit configured to acquire an encoding target block having a plurality of groups each including a predetermined number of pixels, a deciding unit configured to decide for each group a quantization parameter used to quantize image data of the group and an encoding scheme so that a code length of the encoding target block does not exceed a predetermined value, wherein the deciding unit selects, as the encoding scheme of a respective group, either of a first encoding scheme that outputs quantized image data and a second encoding scheme that outputs encoded data of a differential between quantized image data and prediction data, and an encoding unit configured to generate encoded data by encoding image data of the encoding target block in accordance with the quantization parameters and the encoding schemes decided for the respective groups.

14 Claims, 11 Drawing Sheets

(51) Int. Cl.
*H04N 19/176* (2014.01)
*H04N 19/103* (2014.01)
*H04N 19/146* (2014.01)
*H04N 19/50* (2014.01)

(56) References Cited

U.S. PATENT DOCUMENTS

| | | | |
|---|---|---|---|
| 6,414,992 B1* | 7/2002 | Sriram | H04N 19/56 375/240.02 |
| 7,444,031 B2* | 10/2008 | Fukuzawa | G06T 5/10 382/232 |
| 8,718,391 B2 | 5/2014 | Lee et al. | |
| 2005/0015248 A1 | 1/2005 | Kadono et al. | |
| 2011/0292247 A1 | 12/2011 | Gharavi-Alkhansari et al. | |
| 2013/0251257 A1 | 9/2013 | Ohnishi et al. | |
| 2016/0366409 A1 | 12/2016 | Ranjan | |

OTHER PUBLICATIONS

Notice of Allowance dated Oct. 2, 2018, that issued in related U.S. Appl. No. 15/139,008.

* cited by examiner

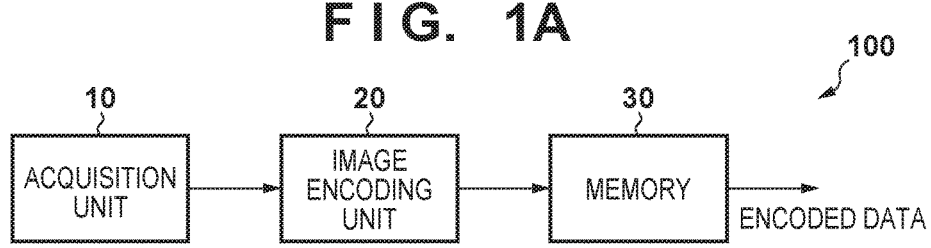
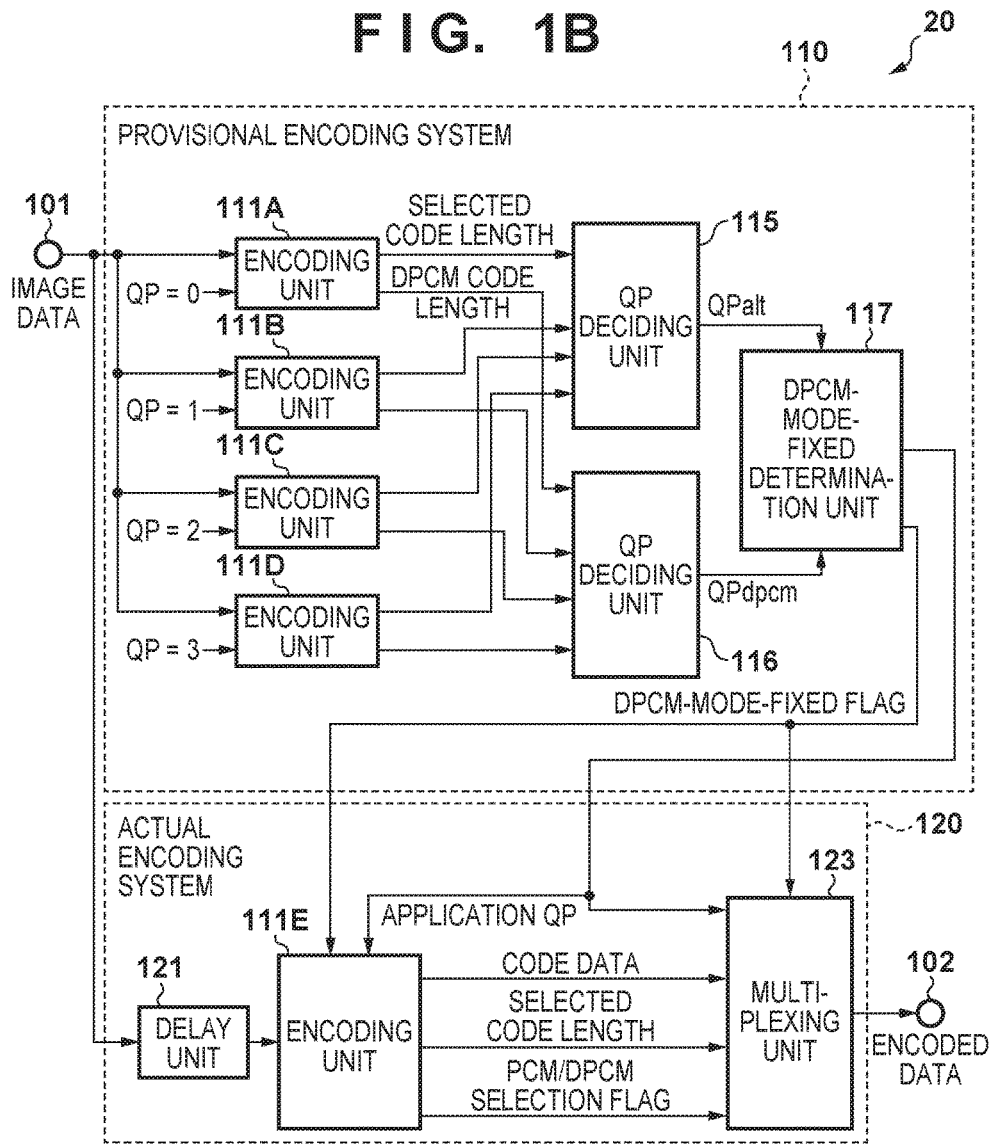

FIG. 4A

| GROUP NUMBER | 0 | | | 1 | | | 2 | | | ...... | 15 | | |
|---|---|---|---|---|---|---|---|---|---|---|---|---|---|
| PIXEL NUMBER | 0 | 1 | 2 | 3 | 4 | 5 | 6 | 7 | 8 | ...... | 45 | 46 | 47 |
| IMAGE DATA | R0 | G0 | B0 | R1 | G1 | B1 | R2 | G2 | B2 | ...... | R15 | G15 | B15 |

FIG. 4B

| GROUP NUMBER | 0 | | | | 1 | | | | 2 | | | | ...... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ...... | 28 | 29 | 30 | 31 |
| IMAGE DATA | Cb0 | Y0 | Cr0 | Y1 | Cb1 | Y2 | Cr1 | Y3 | Cb2 | Y4 | Cr2 | Y5 | ...... | Cb7 | Y14 | Cr7 | Y15 |

FIG. 4C

| GROUP NUMBER | 0 | | | | 1 | | | | 2 | | | | ...... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ...... | 28 | 29 | 30 | 31 |
| IMAGE DATA | R0 | Gr0 | Gb0 | B0 | R1 | Gr1 | Gb1 | B1 | R2 | Gr2 | Gb2 | B2 | ...... | R7 | Gr7 | Gb7 | B7 |

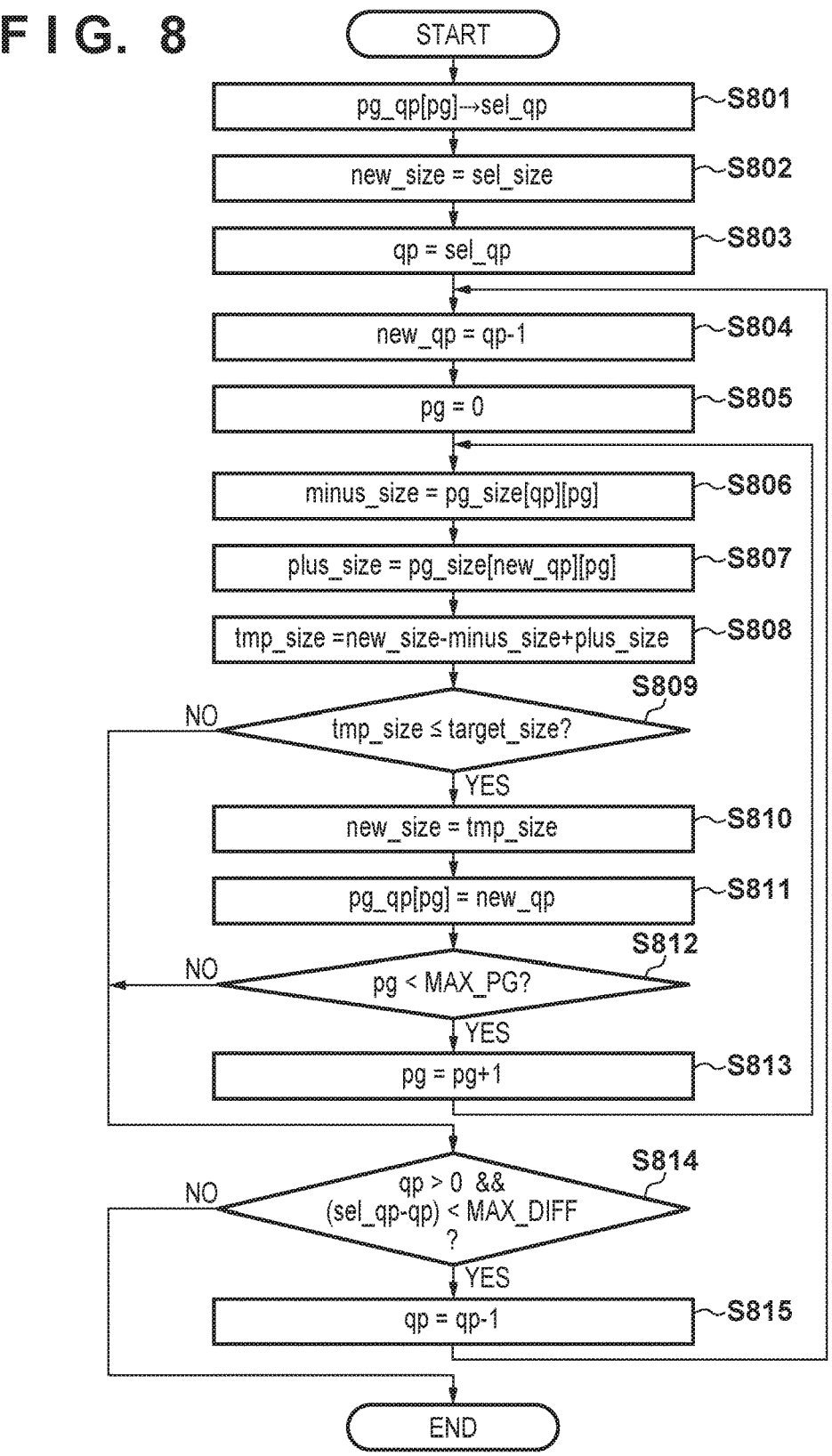

FIG. 9A

| QP | \multicolumn{16}{c}{PIXEL GROUP NUMBER} | HEADER CODE LENGTH | BLOCK CODE LENGTH |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 35 | 35 | 28 | 28 | 25 | 38 | 20 | 21 | 22 | 23 | 23 | 22 | 21 | 24 | 24 | 15 | 23 | 433 |
| 1 | 32 | 32 | 26 | 24 | 24 | 24 | 18 | 19 | 19 | 22 | 21 | 20 | 19 | 21 | 22 | 24 | 23 | 397 |
| 2 | 32 | 32 | 24 | 22 | 22 | 22 | 18 | 17 | 17 | 20 | 19 | 18 | 18 | 20 | 22 | 22 | 23 | 371 |
| 3 | 30 | 30 | 24 | 20 | 20 | 20 | 16 | 16 | 16 | 20 | 18 | 18 | 18 | 20 | 20 | 20 | 23 | 349 |

FIG. 9B

| QP | \multicolumn{16}{c}{PIXEL GROUP NUMBER} | HEADER CODE LENGTH | BLOCK CODE LENGTH |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 35 | 35 | 28 | 28 | 25 | 38 | 20 | 21 | 22 | 23 | 23 | 22 | 21 | 24 | 24 | 15 | 23 | 433 |
| 1 | 32 | 32 | 26 | 24 | 24 | 24 | 18 | 19 | 19 | 22 | 21 | 20 | 19 | 21 | 22 | 24 | 23 | 397 |
| 2 | 32 | 32 | 24 | 22 | 22 | 22 | 18 | 17 | 17 | 20 | 19 | 18 | 18 | 20 | 22 | 20 | 23 | 371 |
| 3 | 30 | 30 | 24 | 20 | 20 | 20 | 16 | 16 | 16 | 20 | 18 | 18 | 18 | 20 | 20 | 20 | 23 | 349 |

FIG. 9C

| QP | \multicolumn{16}{c}{PIXEL GROUP NUMBER} | HEADER CODE LENGTH | BLOCK CODE LENGTH |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 26 | 30 | 30 | 26 | 30 | 25 | 21 | 20 | 23 | 26 | 24 | 19 | 19 | 20 | 21 | 20 | 7 | 389 |
| 1 | 23 | 28 | 29 | 24 | 25 | 22 | 18 | 21 | 22 | 24 | 23 | 18 | 17 | 19 | 21 | 17 | 7 | 361 |
| 2 | 20 | 26 | 26 | 21 | 22 | 20 | 18 | 18 | 20 | 19 | 15 | 13 | 13 | 16 | 17 | 17 | 7 | 315 |
| 3 | 20 | 24 | 24 | 18 | 20 | 17 | 16 | 20 | 17 | 16 | 13 | 10 | 10 | 14 | 13 | 16 | 7 | 283 |

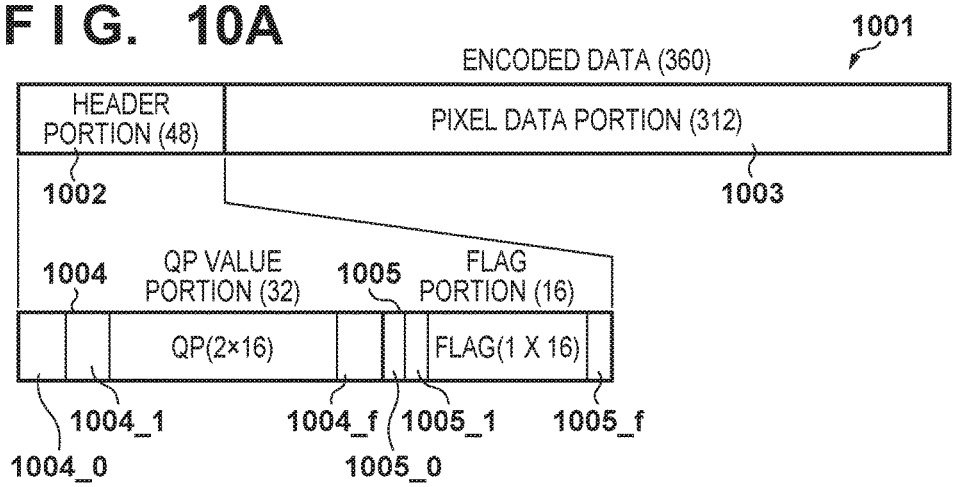
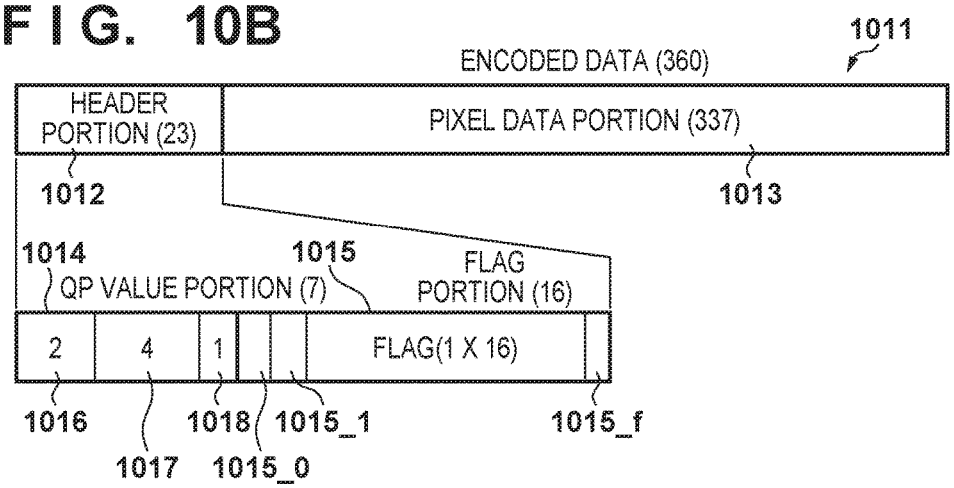
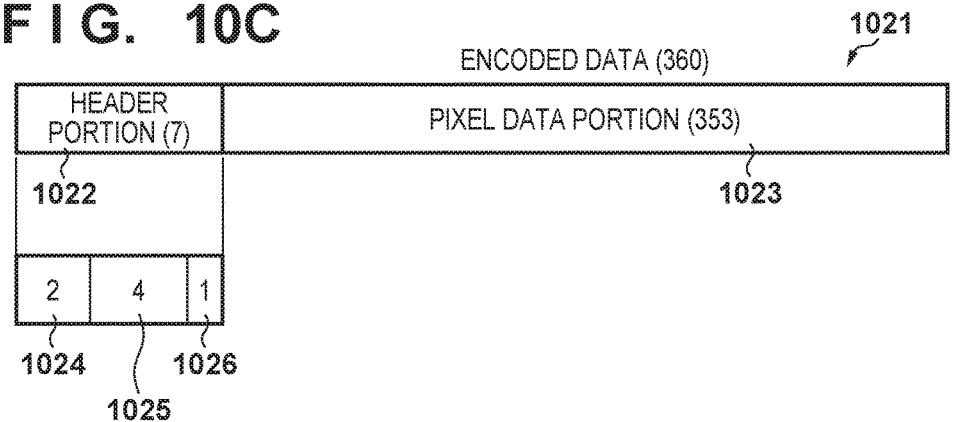

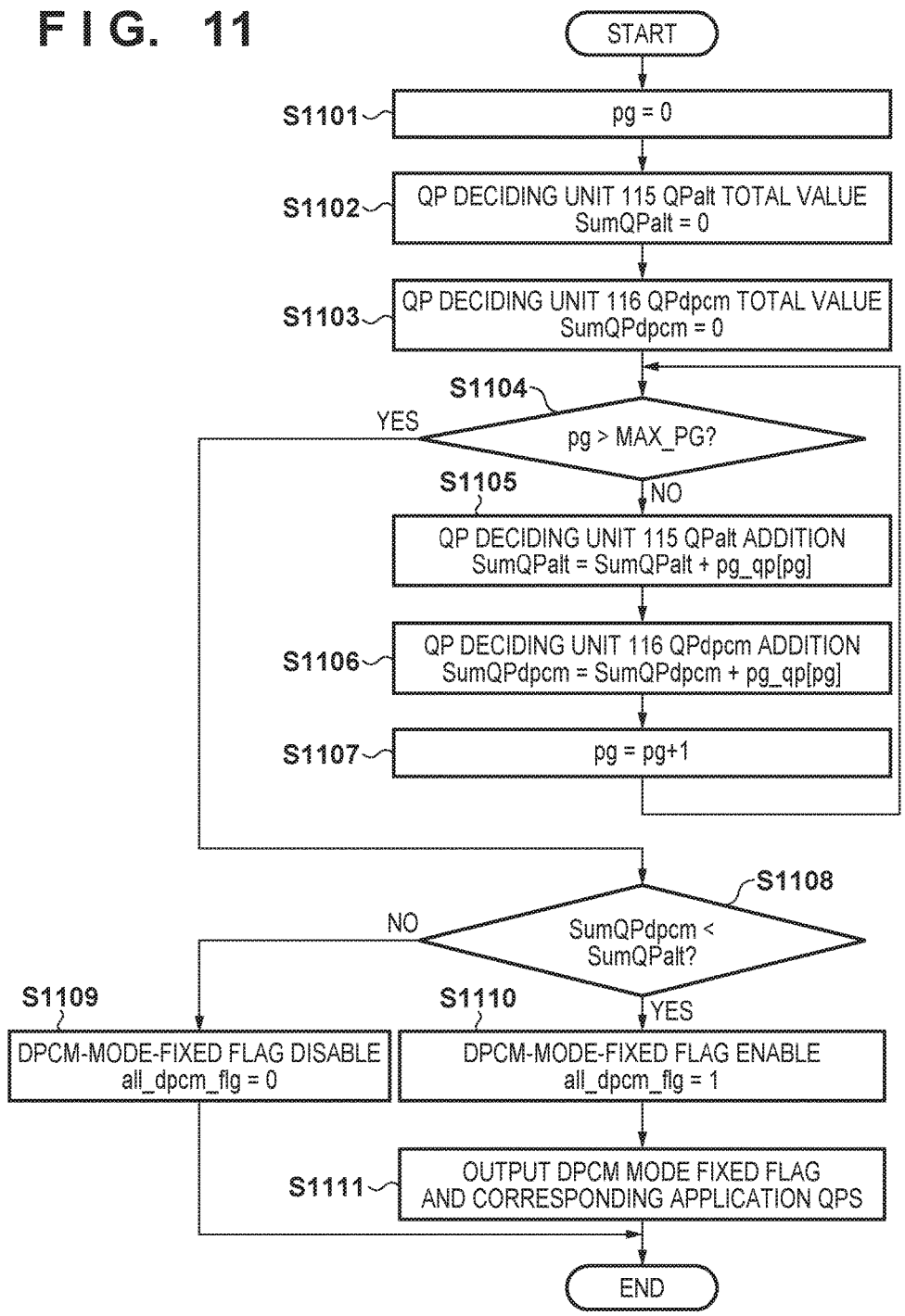

IMAGE PROCESSING APPARATUS AND IMAGE PROCESSING METHOD USING IMPROVED PREDICTIVE ENCODING TECHNIQUES

BACKGROUND OF THE INVENTION

Field of the Invention

The present invention relates to an image processing apparatus and an image processing method.

Description of the Related Art

In recent years, for image capturing apparatuses such as those for digital video or the like, the image data amount handled in a system has increased significantly in accompaniment of an increase in resolution and an increase in frame rates, and there is demand for acceleration of image memory and bus interface circuits. With respect to this, it is possible to handle demand for circuit acceleration by reducing the amount of image data by performing compression encoding of image data for image memory and for a bus interface.

In such a case, it is desired that the encoding scheme for image compression have a small circuit scale, and a short encoding delay. Therefore, it is unsuitable in conventional DCT-based encoding schemes as typified by the JPEG and MPEG2. Accordingly, a proposal has been made for a DPCM (Differential Pulse Code Modulation) based predictive encoding scheme (refer to Japanese Patent Laid-Open No. 2010-004514).

In a DPCM-based predictive encoding scheme, a degradation of image quality tends to occur at an edge portion where a change in pixel levels is large. In the proposed scheme of Japanese Patent Laid-Open No. 2010-004514, encoding with low image quality degradation is possible if a difference in values between adjacent pixel data is less than or equal to a predetermined threshold. However, if the difference in values between adjacent pixel data exceeds a predetermined threshold as with a sharp edge portion, it is necessary to half the original pixel data bits by quantization (for example, to turn 10 bits into 5 bits), and this becomes a major cause of image quality degradation. Similarly, it becomes a major cause of image quality degradation if the difference between a predicted image and an encoding target image is large.

SUMMARY OF THE INVENTION

The present invention reduces a degradation of image quality in a portion for which a difference between pixels is large such as a sharp edge portion by performing encoding efficiently.

One aspect of embodiments of the invention relates to an image processing apparatus comprising, an acquiring unit configured to acquire an encoding target block having a plurality of groups each including a predetermined number of pixels, a deciding unit configured to decide for each group a quantization parameter used to quantize image data of the group and an encoding scheme so that a code length of the encoding target block does not exceed a predetermined value, wherein the deciding unit selects, as the encoding scheme of a respective group, either of a first encoding scheme that outputs quantized image data and a second encoding scheme that outputs encoded data of a differential between quantized image data and prediction data, and an encoding unit configured to generate encoded data by encoding image data of the encoding target block in accordance with the quantization parameters and the encoding schemes decided for the respective groups by the deciding unit, wherein the deciding unit assigns, as the quantization parameter of the respective group, either a first quantization parameter or a second quantization parameter corresponding to a quantization step smaller than a quantization step corresponding to the first quantization parameter, out of the plurality of quantization parameters, and wherein the deciding unit selects as an encoding mode of the encoding target block either a first mode that selects whichever of the first encoding scheme and the second encoding scheme can obtain a smaller code length as the encoding scheme of the group, or a second mode that selects the second encoding scheme as the encoding scheme of all groups of the encoding target block, and decides the quantization parameters and the encoding schemes of the plurality of groups of the encoding target block in accordance with the selected encoding mode.

Further features of the present invention will become apparent from the following description of exemplary embodiments (with reference to the attached drawings).

BRIEF DESCRIPTION OF THE DRAWINGS

FIG. 1A is a block diagram for illustrating an example configuration of an image processing apparatus corresponding to an embodiment of the invention.

FIG. 1B is a block diagram for illustrating an example configuration of an image encoding unit corresponding to an embodiment of the invention.

FIG. 4A to FIG. 4C are views for explaining a relationship between a pixel group and pixel data that configures an encoding block.

FIG. 8 is a flowchart that illustrates an example of processing of step S504 of FIG. 5.

FIG. 9A to FIG. 9C are views that illustrate examples of selected QPs and code lengths of pixel group units corresponding to an embodiment of the invention.

FIG. 10A to FIG. 10C are figures that illustrate examples of a format of encoded data corresponding to an embodiment of the invention.

FIG. 11 is a flowchart that illustrates an example of a process in a DPCM-mode-fixed determination unit corresponding to an embodiment of the invention.

DESCRIPTION OF THE EMBODIMENTS

Figure 2:
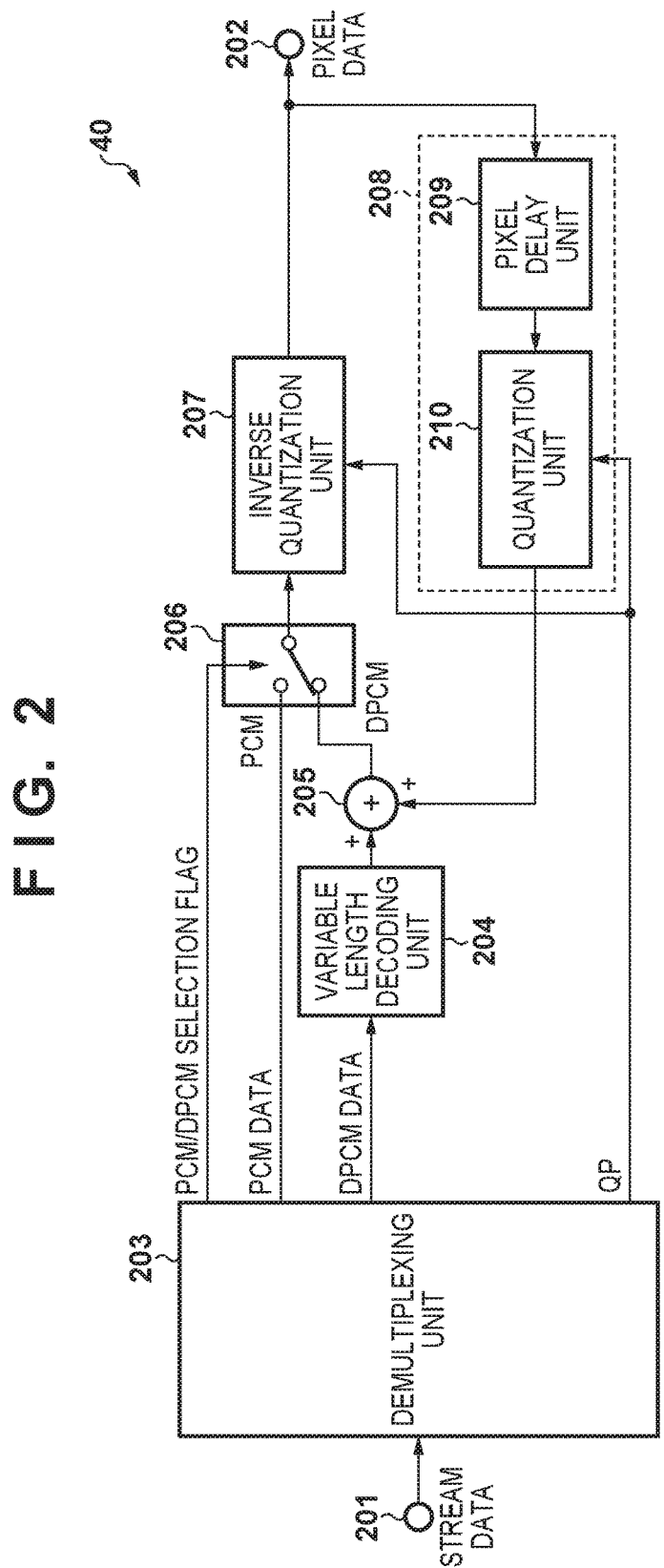
FIG. 2 is a block diagram for illustrating an example configuration of an image decoding unit corresponding to an embodiment of the invention.

Hereinafter, explanation is given of an image processing apparatus corresponding to an embodiment of the invention. FIG. 1A is a view for illustrating an example configuration of an image processing apparatus in embodiments of the invention. An image processing apparatus 100 has an acquisition unit 10, an image encoding unit 20 and a memory 30, for example. In the image processing apparatus 100 of FIG. 1A, each block, except for physical devices such as image capturing elements and display elements, may be configured in hardware using a dedicated device, a logic circuit, a memory or the like. Alternatively, they may be configured in software by a computer such as a CPU executing a processing program stored in a memory. The image processing apparatus 100 can be implemented as a digital camera, for example. In addition to this, it is possible to make it an information processing terminal or image capturing apparatus such as, for example, a personal computer, a mobile telephone, a smart phone, a PDA, a tablet terminal, a digital video camera, or the like.

In FIG. 1A, the acquisition unit 10 has a function of inputting image data. The acquisition unit 10 includes a configuration for inputting image data via a transmission path from outside such as an image capturing unit equipped with an image sensor, for example. Alternatively, the acquisition unit 10 includes a configuration that reads image data from a recording medium. Also, the acquired image data may be still image data, and may also be moving image data. If the image data that the acquisition unit 10 acquires is moving image data, moving image data of a plurality of frames may be acquired consecutively.

The acquisition unit 10 supplies the acquired image data to the image encoding unit 20. The image encoding unit 20 outputs encoded data for which an amount of information is compressed by encoding the image data supplied from the acquisition unit 10 in accordance with an encoding scheme such as one of a pulse code modulation (PCM) or a differential pulse code modulation (DPCM). The outputted encoded data is stored in the memory 30. The memory 30 has a storage capacity necessary to store encoded data output from the image encoding unit 20. For the encoded data stored in the memory 30, image development processing and additional compression processing is implemented in a processing unit of a subsequent stage.

Note that in FIG. 1A, the obtainment unit, the image encoding unit 20 and the memory 30 are illustrated as independent configurations, but when implementing the image processing apparatus 100, these may be integrated together in 1 chip, for example, or may be configured independently as separate bodies.

<Explanation of Image Encoding Unit>

Hereinafter, explanation is given of a configuration of the image encoding unit 20 corresponding to an embodiment of the invention with reference to FIG. 1B. FIG. 1B is a block diagram for illustrating an example configuration of the image encoding unit 20 corresponding to an embodiment of the invention. Hereinafter, explanation is given for operation of each block of the image encoding unit 20 of the present embodiment.

The image encoding unit 20 illustrated in FIG. 1A is configured by 2 large blocks of a provisional encoding system 110 and an actual encoding system 120. Furthermore, the provisional encoding system 110 is configured from encoding units 111A-111D, QP deciding units 115 and 116 and a DPCM-mode-fixed determination unit 117. The provisional encoding system 110 operates to decide a DPCM-mode-fixed flag and a set of quantization parameters used when performing actual encoding by the actual encoding system 120. The DPCM-mode-fixed flag is a flag that designates whether to execute encoding process in the actual encoding system 120 in either of a first encoding mode that executes switching PCM and DPCM, and a second encoding mode that executes fixing DPCM. The actual encoding system 120 is configured by a delay unit 121, an encoding unit 111E and a multiplexing unit 123, and executes actual encoding including quantization processing using the set of quantization parameters decided by the provisional encoding system 110. Also, the encoding result is multiplexed in accordance with the value of the DPCM-mode-fixed flag to generate encoded data, which is output to the outside.

The image encoding unit 20 may be configured integrally in hardware using memory, logic circuits and dedicated devices as an image encoding apparatus, or may be configured by distributing among a plurality of devices. Alternatively, they may be configured in software by a computer such as a CPU executing a processing program stored in a memory.

Image data which is an encoding target is inputted into the image encoding unit 20 from outside via an input terminal 101. In the present embodiment, explanation is given with RGB image data illustrated in FIG. 4A as an example of the format of the image data, but other data formats are also possible. Details of other data formats are explained with reference to FIGS. 4B and C at the end of the present embodiment. Also, it is assumed that image data is inputted in a raster scan order, and each pixel data item of R (red), G (green) and B (blue), which respectively are color components are time-divisionally multiplexed and input sequentially. Also, the bit depth of each pixel is 10 bits, as an example.

<Explanation of Encoding Blocks and Pixel Groups>

In the present embodiment, it is assumed that in the image encoding processing that the image encoding unit 20 executes, the input image data is divided into blocks (hereinafter referred to as "encoding blocks") that have a predetermined size (number of pixels), and that encoding is performed in units of encoding blocks. Also, the encoding blocks are further divided into "pixel groups" comprising a predetermined number of one or more pixels. A pixel group is a unit for which later explained encoding method (PCM/DPCM) switching, and quantization parameter (hereinafter referred to as "QP") switching is performed. It is advantageous that pixel groups be configured by pixels having a high correlation such as pixels of the same coordinates or adjacent pixels, and they may be configured for a single color component, or may be configured for multiple color components.

In the present embodiment, 16 horizontal pixels×1 vertical pixel for each color component of RGB image data×3 colors=48 pixels is made to be an encoding block. Also, a total of 3 pixels–1 pixel for each color component—is made to be a pixel group.

FIG. 4A is a view for explaining a relationship between a pixel group and pixel data that configures an encoding block in the present embodiment. As illustrated in FIG. 4A, an encoding block is configured from 16 pixels for each of R, G and B color components. Also, a group number is assigned for each set of color components comprising R, G and B in accordance with the pixel position, and one of pixel numbers 0-47 is assigned for each pixel. For example, R0, G0 and B0, which respectively are first pixel data of color components, configure a pixel group whose group number is "0", and R1, G1 and B1, which are second pixel data, configure a pixel group whose group number is "1". In the present embodiment, the data of each pixel is referred to as "image data".

<Explanation of an Encoding Unit 111>

Figure 3:
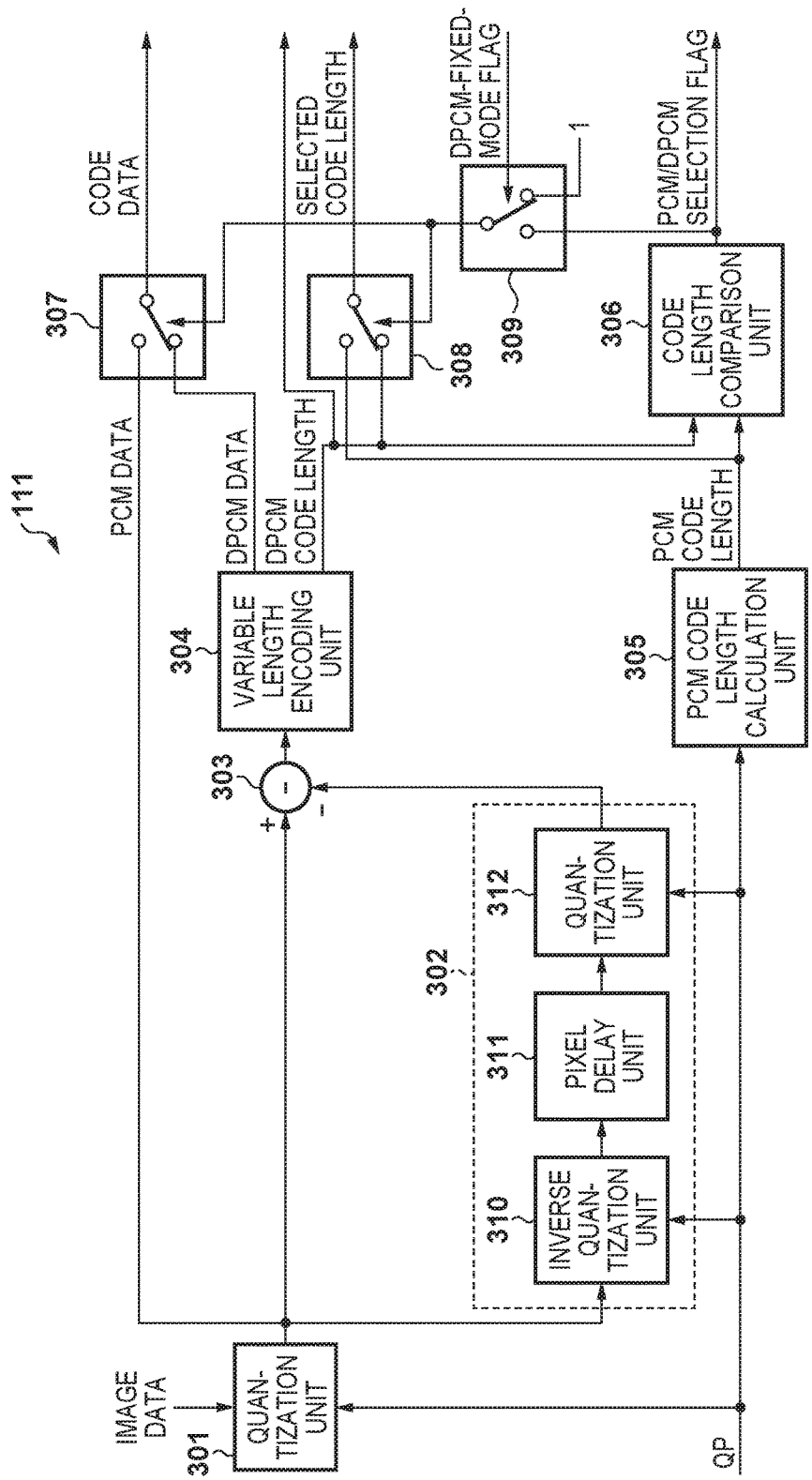
FIG. 3 is a block diagram for illustrating an example configuration of an image encoding unit corresponding to an embodiment of the invention.

Next, explanation is given with reference to FIG. 3 for a configuration and operation of the encoding unit 111 which is used commonly by the provisional encoding system 110 and the actual encoding system 120. FIG. 3 is a block diagram that illustrates an example configuration of the encoding unit 111. As illustrated in FIG. 3, the encoding unit 111 is configured to include, for example, a quantization unit 301, a prediction unit 302, a subtractor 303, a variable length encoding unit 304, a PCM code length calculation unit 305, a code length comparison unit 306 and selectors 307, 308 and 309.

Image data and a QP are input into the encoding unit 111. In the case of the provisional encoding system 110, a QP may be assigned in advance as a fixed value for each of the encoding units 111A-111D. In FIG. 1B, a case in which 0, 1, 2 and 3 are assigned as QPs for the encoding units 111A-111D in that order is illustrated as an example. In the case of the provisional encoding system 110, each encoding unit may hold a QP value in advance. A QP that is decided by the provisional encoding system 110 is input into the actual encoding system 120 from the DPCM-mode-fixed determination unit 117. Hereinafter, detailed explanation is given for specific configuration and operation of the encoding unit 111.

First, image data input into the encoding unit 111 is input into the quantization unit 301. The quantization unit 301 quantizes input image data in accordance with the provided QP, and outputs quantized data to the prediction unit 302, the subtractor 303 and a selector 307 respectively. In the present invention, quantization data that is quantized by the quantization unit 301 is referred to as PCM data. In the present embodiment, explanation is given assuming that the value of the QP is made to be an integer value for which a minimum value is made to be 0, and which can be changed in the range of 0-3; however, larger QP values may be set to use even larger quantization steps.

In the present embodiment, the quantization unit 301 makes a quantization step smaller (finer) the smaller the QP is, and makes a quantization step larger (coarser) the larger the QP is. When the QP increases by 1, a quantization is performed so that significant bits of the PCM data decrease 1 bit. For example, a quantization represented by Equation 1 is performed.

$$\text{Quant}=\text{Data}/(1<<\text{QP}) \quad \text{(Equation 1)}$$

(Quant: quantization data, Data: input image data, QP: quantization parameter.)

Also, the 1<<QP indicates that the input image data is bit shifted by the number of bits indicated by the QP.

The significant bits and the values output for the QPs by the quantization as in Equation 1 are as follows.

QP=0: quantization step=1, the input data is output unchanged without being quantized.
Significant bits are invariant.

QP=1: quantization step=2, the input data is quantized into ½. Significant bits are decreased by 1 bit.

QP=2: quantization step=4, the input data is quantized into ¼. Significant bits are decreased by 2 bits.

QP=n: quantization step=(1<<n), the input data is quantized into 1/(1<<n). Significant bits are decreased by n bits.

The foregoing Equation 1 indicates one example of quantization processing in the present embodiment, and the quantization processing is not limited to this. It is sufficient that quantization be such that the code length is decreased 1 bit whenever QP changes by 1. For example, a non-linear quantization may be performed. In the present embodiment, causing the value of QP to increase each time by 1 from QP=0 to QP=n is referred to as increasing the quantization step by 1 step, making it 1 step larger, making it 1 step coarser, or the like. Also, conversely, causing the value of QP to decrease each time by 1 from QP=n to QP=0 is referred to as decreasing the quantization step by 1 step, making it 1 step smaller, making it 1 step finer, or the like.

The PCM code length calculation unit 305 uses Equation 2 below to decide the code length of the PCM data output from the quantization unit 301 from the number of bits in the image data (10 bits in the present embodiment) and the QP.

$$\text{PCM code length}=\text{number of bits of image data}-\text{QP} \quad \text{(Equation 2)}$$

In the present embodiment, whenever the value of QP is increased by 1, the PCM data code length is decreased by 1 bit. Accordingly, with an initial value of QP=0, whenever the QP is increased by 1, the code length of the PCM data is made shorter from the 10 bits by 1 bit. Here, the PCM code length is a fixed value because the value of QP is assigned fixedly for each of the encoding units 111A-111D in the provisional encoding system 110. Accordingly, configuration may be taken in which rather than the PCM code length calculation unit 305 calculating the PCM code length by a calculation with Equation 2, a fixed value for the PCM code length based on the value of the assigned QP is held and output. The PCM code length calculation unit 305 outputs the decided PCM code lengths to each of the code length comparison unit 306 and a selector 308.

Next, explanation is given for operation of the prediction unit 302. The prediction unit 302, as is illustrated in FIG. 3, is configured to include an inverse quantization unit 310, a pixel delay unit 311 and a quantization unit 312. After the PCM data that is inputted into the prediction unit 302 is temporarily inverse quantized by the inverse quantization unit 310, it is inputted into the pixel delay unit 311. In inverse quantization processing in the inverse quantization unit 310, the QP that the quantization unit 301 used for the image data quantization is used unchanged. The pixel delay unit 311 delays by a color component amount so that a previous value of the same color component becomes prediction data.

For example, in the present embodiment, the image data for each color component in RGB is inputted in order as illustrated in FIG. 4A, and after encoding of the image data G0, the image data of B0 and R1 are first encoded before next encoding G1. Thus, the pixel delay unit 311 causes 3 pixels worth of delay, and outputs the held image data that is inverse quantized to the quantization unit 312 at a timing at which G1 is encoded. The quantization unit 312 quantizes image data inputted from the pixel delay unit 311. At this point, because the QP that the quantization unit 301 uses when quantizing the image data G1 is inputted into the quantization unit 312, the quantization steps match between the quantization unit 301 and the quantization unit 312. A configuration that re-quantizes after the inverse quantization is performed in the prediction unit 302 is a configuration that is necessary to cause the quantization steps to match if the values of the QP differ between pixels, and that is necessary in the actual encoding system 120. On the other hand, because the QP is fixed in the provisional encoding system 110, the inverse quantization unit 310 and the quantization unit 312 may be omitted, leaving only the pixel delay unit 311. The quantization result in the quantization unit 312 is outputted to the subtractor 303 as prediction data. Note that because no previous pixel exists for the first pixel (R0, G0, B0) of the encoding block of each color component, a value of 0 is outputted as the prediction data.

The subtractor 303 outputs to the variable length encoding unit 304 a difference between the PCM data from the quantization unit 301 and the prediction data from the prediction unit 302 as prediction difference data. The prediction difference data is data that has a positive or negative value, and becomes a value close to 0 at level portions for which changes in the image data are small, and becomes a large value at an edge portion for which a change is large. The prediction difference data has a characteristic of a Laplace distribution centered at 0, generally.

The variable length encoding unit 304 performs encoding by a predetermined variable length encoding scheme on the inputted prediction difference data, and outputs code data and a code length for each 1 pixel. The code data is outputted to the selector 307, and the code length is outputted to the code length comparison unit 306, the selector 308, and outside of the encoding unit 111 respectively. Huffman coding and Golomb coding, for example, are encompassed in the predetermined variable length encoding scheme. By the variable length encoding scheme that the variable length encoding unit 304 executes, code data of a shortest code length is assigned if the input value is 0, and the larger the absolute value of the input value becomes, the longer the code length of the code data becomes. Note that in the present embodiment, code data outputted from the variable length encoding unit 304 is referred to as DPCM data, and the code length of the same is referred to as a DPCM code length.

The code length comparison unit 306 compares the PCM code length and the DPCM code length in a pixel group unit as previously explained to generate a PCM/DPCM selection flag for selecting code data whose code length becomes smaller. The code length comparison unit 306 is configured so to hold a DPCM code length and a PCM code length of each color of R, G and B which configure a pixel group. The PCM/DPCM selection flag is output to the selector 309, and is used for switching of output data by each selector in accordance with the value of the DPCM-mode-fixed flag. It is also output to the outside of the encoding unit 111.

<Code Length Comparison Flow>

Figure 7:
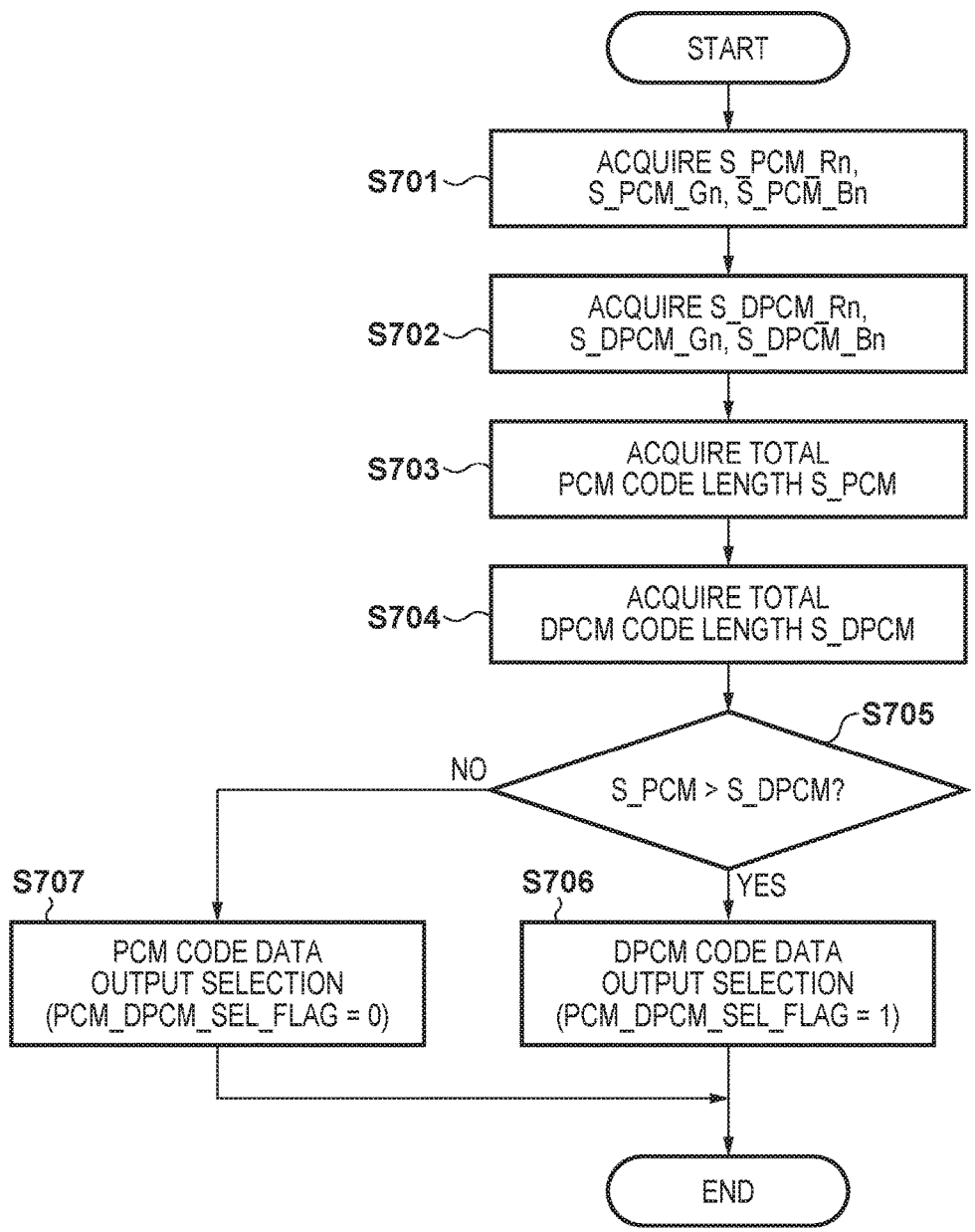
FIG. 7 is a flowchart that illustrates an example of a process in a code length comparison unit corresponding to an embodiment of the invention.

Here, with reference to the flowchart of FIG. 7, explanation is given of details of a comparison of code lengths in the code length comparison unit 306. The comparison of code lengths is performed in a pixel group unit as previously described.

The code length comparison unit 306 acquires a PCM code length for each color component below from the PCM code length calculation unit 305 in step S701, and continuing on, in step S702 acquires a DPCM code length for each color component below from the variable length encoding unit 304.

S_PCM_Rn: the PCM code length of Rn
S_PCM_Gn: the PCM code length of Gn
S_PCM_Bn: the PCM code length of Bn
S_DPCM_Rn: the DPCM code length of Rn
S_DPCM_Gn: the DPCM code length of Gn
S_DPCM_Bn: the DPCM code length of Bn Here, an example is illustrated of execution on a pixel of group number n as a target for data input of an RGB component format of FIG. 4A. In the present embodiment, each code length is acquired in the foregoing step, but the order is not particularly limited so long as the DPCM and PCM code lengths for all pixels in the pixel group can be acquired.

Continuing on, the code length comparison unit 306, in step S703, acquires a total value for the PCM code length (S_PCM), adding the code lengths acquired in step S701. Similarly, the code length comparison unit 306, in step S704, acquires a total value for the DPCM code length (S_DPCM), adding the code lengths acquired in step S702. Continuing on, in step S705 the code length comparison unit 306 compares S_PCM and S_DPCM to determine which is larger/smaller. If the code length of DPCM for the pixel group is smaller (YES in step S705), transition is made to step S706, and PCM/DPCM selection flag information that selects the DPCM code data (PCM_DPCM_SEL_FLAG=1) is output. Meanwhile, if the PCM code length is smaller (NO in step S705), transition is made to step S707, and PCM/DPCM selection flag information selecting the PCM code data (PCM_DPCM_SEL_FLAG=0) is output.

Returning to the explanation of FIG. 3, the selector 309 switches a fixed value provided in advance and the DPCM-mode-fixed flag input from outside of the encoding unit 111 in accordance with the PCM/DPCM selection flag input from the code length comparison unit 306, and outputs to the selectors 307 and 308. If the value of the DPCM-mode-fixed flag is 0, the selector 309 selects the PCM/DPCM selection flag, and that flag information is notified to the selectors 307 and 308 as is. On the other hand, if the value of the DPCM-mode-fixed flag is 1, the fixed value is selected. In the present embodiment, the fixed value is 1, and the value of the PCM/DPCM selection flag is fixed to be 1 (DPCM-mode-fixed (PCM_DPCM_SEL_FLAG=1)). Accordingly, the selectors 307 and 308 select the input from the variable length encoding unit 304.

PCM data and DPCM data are input to the selector 307, and the code data is selected in accordance with the PCM/DPCM selection flag from the selector 309, and output to the outside of the encoding unit 111. Specifically, if the flag value of the PCM/DPCM selection flag is 1, the DPCM data is selected; if the flag value is 0, the PCM data is selected. A PCM code length and a DPCM code length are input to the selector 308, and the code length is selected in accordance with the PCM/DPCM selection flag, and output to the outside of the encoding unit 111. In the present embodiment the code length output from the selector 308 is specifically referred to as the "selected code length". Specifically, if the flag value of the PCM/DPCM selection flag is 1, the DPCM code length is selected; if the flag value is 0, the PCM code length is selected.

<Explanation of Provisional Encoding System>

Returning to the explanation of the image encoding unit 20 of FIG. 1A and FIG. 1B, explanation is given for provisional encoding processing in the provisional encoding system 110. For the image data input into the provisional encoding system 110 in FIG. 1A and FIG. 1B, encoding is performed with a QP of 0 to 3 respectively by the plurality of encoding units 111A-111D, and the selected code length and the DPCM code length are output to the QP deciding unit 115 and the QP deciding unit 116 respectively. Here, the selected code lengths represent code lengths of coded data into which the result of quantization that performed the quantization processing by the quantization step corresponding to the respective QP is encoded in PCM or DPCM by the respective encoding unit, and are output from the selector 308. The DPCM code length represents a code length of a result of the variable length encoding unit 304 DPCM encoding the result of quantization that performed the quantization processing in the quantization step corresponding to each QP for each encoding unit. The encoding units 111A-111D have a configuration illustrated in FIG. 3, and code data, selected code length, DPCM code length, and a PCM/DPCM selection flag exist as output signals. However, the provisional encoding system 110 may use the selected code length and the DPCM code length, and not use the code data and the PCM/DPCM selection flag.

Note that because the range of QP used for encoding in the present embodiment is 0-3, the provisional encoding system 110 is provided with 4 of the encoding unit 111. However, embodiments of the invention are not limited to this configuration, and it is possible to change the number of the encoding unit 111 in accordance with the range of the QP used for encoding. Also, it is assumed that in the provisional encoding system 110, the DPCM-mode-fixed flag which is an input signal from the encoding units 111A-111D is fixed to 0, and the PCM/DPCM selection flag which is based on the result of the determination of the code length comparison unit 306 described above is always used.

<Operation of the QP Deciding Unit>

The QP deciding units 115 and 116 respectively decide QPalt and QPdpcm which become application QP candidates for application to a pixel group unit by the actual encoding system 120 based on the plurality of code length information elements of each QP inputted from the encoding units 111A-111D of the preceding stage. Here, the selected code length that becomes the input signal to the QP deciding unit 115 is the smaller value code length of the PCM code length or the DPCM code length obtained in each of the encoding unit 111. Meanwhile, the code length that becomes the input signal to the QP deciding unit 116 becomes the DPCM code length in the encoding unit 111. For the QP deciding unit 116, while the input signal differs, the basic configuration and processing content is the same as that of the QP deciding unit 115. Below, explanation is given of operation of each QP deciding unit.

<Operation of the QP Deciding Unit 115>

Figure 5:
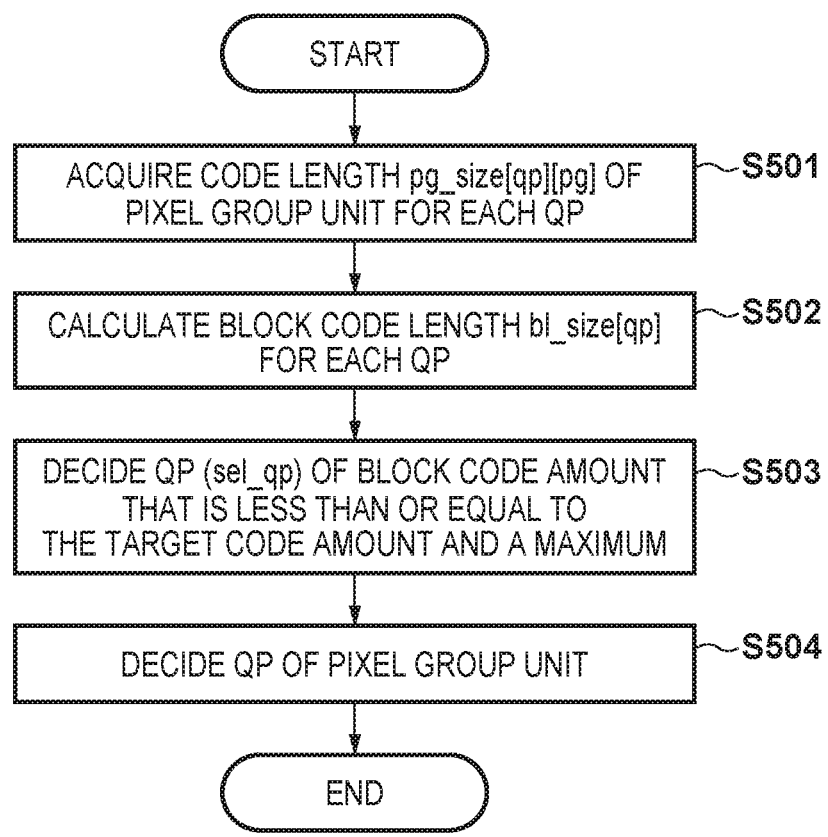
FIG. 5 is a flowchart that illustrates an example of a process in a QP deciding unit corresponding to an embodiment of the invention.

In the present embodiment, using FIG. 5, explanation is given of an overview of a processing procedure that the QP deciding unit 115 executes. When this processing in FIG. 5 is started for each encoding block, the QP deciding unit 115, in step S501, acquires, for a pixel group unit, code length information calculated for each QP assigned to a respective encoding unit from the encoding units 111A-111D. Hereinafter, the code length of the code data that is acquired will be represented as pg_size[qp][pg] whose elements are the value of QP: qp and the pixel group number: pg. qp takes a value from 0 to 3, and pg takes a value from 0 to 15.

Next, the QP deciding unit 115, in step S502, calculates the total code lengths of the encoding block for each QP. It is necessary to consider the code length of the header information which is multiplexed to the encoded data when calculating the code length of the encoding block overall. The header information is information of the PCM/DPCM selection flag and the QP for each pixel group that is necessary for when decoding, and the code length of the header information here is assumed to be 23 bits. A data configuration of this header information is explained later with reference to FIG. 10B.

A calculation of a block code length bl_size[qp] that adds a total of the code lengths of all pixel groups and the code length hd_size (=23 bits) of the header information is performed. FIG. 9A illustrates a specific example of values of pg_size[qp][pg] and bl_size[qp]. In FIG. 9A, a value (35) that a reference numeral 901 indicates, for example, is pg_size[0][0], and indicates the code length for the case where the head pixel group in the encoding block is encoded with the QP=0. Similarly, a value (24) that a reference numeral 902 indicates, for example, is pg_size[0][15], and indicates the code length for the case where the last pixel group in the encoding block is encoded with the QP=0. Also, a value that a reference numeral 903 indicates (433) is bl_size[0], and indicates a block code length in a case of encoding with QP=0; a value that a reference numeral 904 indicates (349) is bl_size[3], and indicates a block code length in the case of encoding with QP=3. These values are represented in units of bits. Explanation is given using the values of this figure as an example of specific values in the explanation that follows as well.

Figure 6:
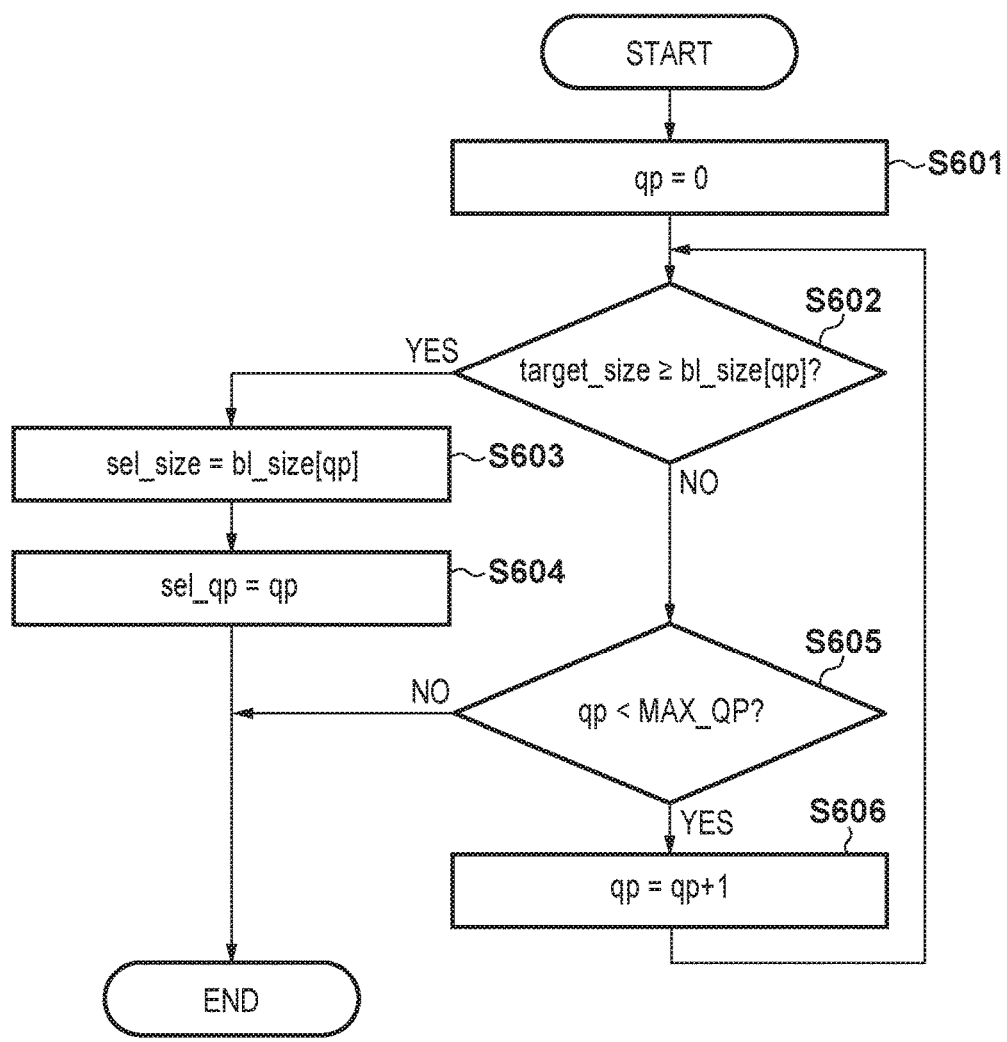
FIG. 6 is a flowchart that illustrates an example of processing of step S503 of FIG. 5.

Next, the QP deciding unit 115, in step S503, selects from bl_size[qp] into sel_size a block code length that is less than or equal to a predetermined target code amount target_size and that has a maximum value, and selects into sel_qp the qp in that case. The specific processing in step S503 is as is illustrated in the flowchart of FIG. 6.

First, in step S601, the QP deciding unit 115 initializes the value of QP: qp to 0. Next, the QP deciding unit 115, in step S602, compares the code length of an encoding block for the currently selected QP: bl_size[qp] and the target code amount: target_size. If the result of the comparison is that bl_size[qp] is less than or equal to target_size ("YES" in step S602), transition is made to step S603; if bl_size[qp] is larger than target_size ("NO" in step S602), transition is made to step S605.

In step S603, bl_size[qp] that became the determination target in step S602 is set to the block code length sel_size that should be selected. Next, in step S604, a value of the QP of bl_size[qp] is set to sel_qp which represents a provisional QP of the encoding block, and the processing terminates.

In step S605, it is determined whether or not the value of the QP that is currently selected is smaller than the maximum value (MAX_QP); if it is smaller than the maximum value ("YES" in step S605), the value of QP is updated by one in step S606, step S602 is returned to, and the processing continues. If the current value of QP is greater than or equal to the maximum value ("NO" in step S605), the processing terminates. In the present embodiment, the value of MAX_QP is 3. Note that no block code length that is smaller than the target code amount exists and a QP cannot be selected if NO is determined in step S605. However, in reality, it is possible to design so that a block code length that falls below the target code amount between the minimum value and the maximum value for QP is obtained by adjusting the value of the target code amount and the QP deciding range in advance based on the number of bits of image data.

In this fashion, the code length of the encoding block is compared with the target code amount in order while increasing the quantization step 1 step at a time from 1 to 2, and 2 to 4 by updating by 1 each time from the initial value of QP=0. Then it is possible to make the first value of QP corresponding to the block code length that is less than or equal to the target code amount be the provisional QP value. Explanation is given having the specific value of the target code amount target_size be 360 bits explanatorily in the present embodiment. Because the information amount of the image data prior to encoding is 10 bits×3×16=480 bits, this value corresponds to ¾ of that. The size of the target code amount can be set optionally in accordance with a compression rate that is expected. In the example illustrated in FIG. 9A, 349 (bits), which is the block code length bl_size[3] where QP: 3, is less than the target code amount of 360 bits, it is selected as sel_size. Also, the value 3 of QP here is set to sel_qp. Here, if the code length of the header information is not included in the code length of the encoding block, the value of the target code amount becomes a value into which the code length of the header information is subtracted from 360 bits. Because in the above-described example the code length of the header is 23 bits, the target code amount in such a case becomes 337 bits.

Returning to the explanation of FIG. 5, the QP deciding unit 115, in step S504, adjusts in a pixel group unit the provisional QP value sel_qp of the encoding block decided in step S503. With this, it is possible to decide the QPalt: pg_qp[pg] for pixel group units. Detail of the processing for deciding pg_qp[pg] in step S504 is explained in detail with reference to the flowchart of FIG. 8.

In FIG. 8, the QP deciding unit 115, in step S801, initializes pg_qp[pg] which is the QPalt for a pixel group unit with the QP: sel_qp decided in step S503. Here all of pg_qp[0]-pg_qp[15] are initialized to the value of sel_qp. In the example of FIG. 9A, because the QP=3 is selected, pg_qp[0]-pg_qp[15] are all initialized to 3. Next, in step S802, the QP deciding unit 115 initializes a parameter new_size which represents a code length of the encoding block at the current time to the value of sel_size decided in step S603. For example, in the example of FIG. 9A, the value of new_size is initialized to 349 in step S802 because sel_size is set to a block code length 349 when QP is 3. The block code length becomes 326 if the header code length is not considered. Next, the QP deciding unit 115, in step S803, initializes the value of the parameter qp which indicates the currently selected QP with the value of sel_qp decided in step S604. For example, in the example of FIG. 9A, the value of qp is initialized to 3 in step S803 because sel_qp is set to 3.

Next, the QP deciding unit 115, in step S804, initializes the value of a parameter new_qp which indicates a new QP with a value that reduces qp by 1. new_qp indicates a value that lowers the value of qp that is currently selected by one. Furthermore, in step S805, the QP deciding unit 115 initializes a parameter pg indicating the number of the pixel group that is the target of processing. Because for pixel groups there are 16 groups from 0 to 15, initialization of pg=0 is performed. Furthermore, the QP deciding unit 115, in step S806 and in step S807, sets minus_size to pg_size[qp][pg], and sets plus_size to pg_size[new_qp][pg]. Here, minus_size indicates a code length of selected pixel group based on the current qp value, and plus_size indicates a code length of a selected pixel group based on the value of new_qp which reduces the current qp by 1. For example, in a case in which pg=0 and qp=3 is considered, minus_size becomes 30 and plus_size becomes 32 in the example illustrated in FIG. 9A. These minus_size and plus_size are used to calculate the amount of change in the block code length of an encoding block expected in a case where qp is changed by only 1 for a pixel group unit.

In step S808, the QP deciding unit 115 obtains a parameter tmp_size which indicates a block code length in a case where qp is changed by 1 for a pixel group unit by Equation 3 from the foregoing new_size, minus_size and plus_size.

$$tmp\_size=new\_size \text{ to } minus\_size+plus\_size \quad (Equation\ 3)$$

For example, if a case where pg=0 and qp=3 is considered, tmp_size=351 because new_size=349, minus_size=30, and plus_size=32 in the example of FIG. 9A.

Next, the QP deciding unit 115, in step S809, determines whether or not tmp_size which is the code length for after qp changes and is obtained in step S808 is less than or equal to the target code amount (target_size). If the value of tmp_size exceeds the target code amount ("NO" in step S809), transition is made to step S814. Meanwhile, if the value of tmp_size is less than or equal to the target code amount ("YES" in step S809), transition is made to step S810. In step S810, the QP deciding unit 115 updates the value of new_size with the value of tmp_size. Next, in step S811, the QP deciding unit 115 updates the application QPalt: pg_qp[pg] of the pixel group which is the target of processing with the value of new_qp. After that, in the processing of step S812 and step S813, the pixel group that is the target of processing is updated. Specifically, in step S812, the QP deciding unit 115 determines whether or not the pixel group number pg that is the current target of processing is smaller than the maximum value (MAX_PG) for a pixel group number. The value of MAX_PG is 15 in the case of the present embodiment. Here, if pg is smaller than the maximum value ("YES" in step S812), transition is made to step S813, the QP deciding unit 115 updates pg by 1, and processing for deciding the QPalt: pg_qp[pg] in a pixel group unit is performed for a new pixel group after returning to step S806. Meanwhile, if pg matches a maximum value ("NO" in step S813), transition is made to step S814.

Next, in step S814, the QP deciding unit 115 determines whether or not the current qp value is larger than 0, and determines whether or not a value that subtracts the current qp from sel_qp is smaller than MAX_DIFF. MAX_DIFF defines a number of times that it is possible to lower qp from sel_qp. MAX_DIFF can be set optionally in accordance with a range of values that QP takes, and can be made to be 1, for example; in such a case, it is possible to lower the value of qp from the value of sel_qp up to 1 time. Because sel_qp=3 in the foregoing example, it is possible to perform processing until qp=2. Limiting the number of times in this way is to limit the recursive processing execution time; MAX_DIFF may be made to be 2 or 3. By deciding MAX_DIFF, it is possible to define the number of types of QP that can be included in the application QPalt by adding to sel_qp.

If, in step S814, qp is 0 or if the number of times that qp was lowered matches MAX_DIFF ("NO" in step S814), the QP deciding unit 115 terminates this processing. If qp is larger than 0 and the number of times that qp was lowered does not reach MAX_DIFF ("YES" in step S814), transition is made step S815. In step S815, the QP deciding unit 115 reduces the value of qp by 1, step S804 is returned to, and the processing repeats. QPalt which becomes a candidate application QP decided in this way is output from the QP deciding unit 115 to the DPCM-mode-fixed determination unit 117.

Here, explanation is given of a concrete example of the processing in FIG. 8 with reference to FIG. 9A. Firstly, based on the selected sel_size (349 in the example of FIG. 9A), the block code length (349−30+32=351) in a case where the value of QP of the pixel group of the pixel group number 0 is made smaller by 1 is calculated, and compared with the target code amount (360). If the calculated block code length is less than or equal to the target code amount, a block code length for a case where the QP of the subsequent pixel group number 1 is made smaller by 1 is calculated, and compared with the target code amount similarly. The block code length of the pixel group number 1 calculated here is (351−30+32=353), which is smaller than the target code amount. In this fashion, block code lengths are calculated by selecting pixel groups in order as follows.

Pixel group number 2: 353−24+24=353
Pixel group number 3: 353−20+22=355
Pixel group number 4: 355−20+22=357
Pixel group number 5: 357−20+22=359
Pixel group number 6: 359−16+18=361

In the foregoing calculated block code length, a block code length of a pixel group number 6 exceeds the target code amount. Accordingly, this processing terminates at this point in time. Specific values of QPalt decided in this way are illustrated in FIG. 9B. In FIG. 9B, the QPs corresponding to the code lengths surrounded in bold lines represent the QPalts decided for each pixel group. For each value of the QPalt of a pixel group unit, pg_qp[0-5] is 2 and pg_qp[6-15] is 3. In this way, the block code lengths that combine the QP values become 359 bits, but processing is performed to add padding bits in the multiplexing unit 123 of a subsequent stage for bits that are insufficient with respect to the target code amount 360 bits. The generated QPalt is output from the QP deciding unit 115 and input to the DPCM-mode-fixed determination unit 117.

In this way, in the present embodiment, QPs are assigned in order from the smallest from the head pixel group. In FIG. 9B, the minimum QP is assigned to a plurality of pixel groups that are consecutive including the head pixel group, but there are cases in which under other conditions the minimum QP is only assigned to the head pixel group.

Also, in the determination of step S814, if MAX_DIFF=2, the pixel group number 0 is returned to once again, the value of QP is caused to be reduced further by 1, and the block code length is calculated in the same way. In the foregoing example:

Pixel group number 0: 359−32+32=359
Pixel group number 1: 359−32+32=359
Pixel group number 2: 359−24+26=361;

here the target code amount is exceeded for the pixel group number 2. Because the value of qp at this point in time is 1, the processing terminates. Respective values of QPalt of a pixel group unit decides in this way are 1 for pg_qp[0-1], 2 for pg_qp[2-5], and 3 for pg_qp[6-15]. The block code length that combines the QP values in this way becomes 359 bits. In the foregoing example, explanation is given for a case that considers a code length of header information; in cases where the code length of the header information is not considered, the 23 bits code length of the header information can be subtracted from the foregoing numerical value as appropriate.

<Operation of the QP Deciding Unit 116>

Next, explanation is given for operation of the QP deciding unit 116. The QP deciding unit 116 has the same configuration as the QP deciding unit 115, but the code lengths that are the input signal are all code lengths resulting from performing encoding processing in DPCM. In the second encoding mode that performs encoding processing only by DPCM, there ceases to be a need to store all of the pixel groups worth of PCM/DPCM selection flags in the encoded data generated finally, and a 16 bit portion is distributed for the image data. As a result, while the value of the header code length hd_size added in step S502 in the operation of the QP deciding unit 115 was 23 bits, the value of the same header code length hd_size in the operation of the QP deciding unit 116 is 7 bits. A data configuration of this header information is explained later with reference to FIG. 10C. Below, explanation is given mainly on points that differ from the operation of the QP deciding unit 115 based on the difference in the header code length hd_size for operation of the QP deciding unit 116 in the flowcharts of FIG. 5, FIG. 6 and FIG. 8.

In step S502 of FIG. 5, a calculation of a block code length bl_size[qp] that adds a total of the code lengths of all pixel groups and the code length hd_size (=7 bits) of the header information is performed. FIG. 9C illustrates a specific example of values of pg_size[qp][pg] and bl_size[qp].

Next, the QP deciding unit 116, in step S503, selects from bl_size[qp] into sel_size a block code length that is less than or equal to the predetermined target code amount target_size and that has a maximum value, and selects into sel_qp the qp in that case. In the example illustrated in FIG. 9C, 315 (bits), which is the block code length bl_size[2] where QP: 2, is less than the target code amount target_size of 360 bits, it is selected as sel_size. Also, the value 2 of QP here is set to sel_qp. Here, if the code length of the header information is not included in the code length of the encoding block, the value of the target code amount becomes a value into which the code length of the header information is subtracted from 360 bits. Because in the above-described example the code length of the header is 7 bits, the target code amount in such a case becomes 353 bits.

In FIG. 8, in step S801, the QP deciding unit 116 initializes pg_qp[pg] which is the QPdpcm for a pixel group unit with the QP: sel_qp decided in step S503. Here all of pg_qp[0]-pg_qp[15] are initialized to the value of sel_qp. In the example of FIG. 9C, because the QP=2 is selected, pg_qp[0]-pg_qp[15] are all initialized to 2. Next, in step S802, the QP deciding unit 116 initializes a parameter new_size which represents a code length of the encoding block at the current time to the value of sel_size decided in step S603. For example, in the example of FIG. 9C, the value of new_size is initialized to 315 in step S802 because sel_size is set to a block code length 315 when QP is 2. The block code length becomes 308 if the header code length is not considered. Next, the QP deciding unit 116, in step S803, initializes the value of the parameter qp which indicates the currently selected QP with the value of sel_qp decided in step S604. For example, in the example of FIG. 9A, the value of qp is initialized to 2 in step S803 because sel_qp is set to 2.

Furthermore, the QP deciding unit 116, in step S806 and in step S807, sets minus_size to pg_size[qp][pg], and sets plus_size to pg_size[new_qp][pg]. For example, in a case in which pg=0 and qp=2 is considered, minus_size becomes 20 and plus_size becomes 23 in the example illustrated in FIG. 9C. These minus_size and plus_size are used to calculate the amount of change in the block code length of an encoding block expected in a case where qp is changed by only 1 for a pixel group unit.

In step S808, tmp_size=318 if, for example, pg=0 and qp=2 because in the example of FIG. 9C, new_size=315, minus_size=20 and plus_size=23.

Below, explanation is given of a concrete example of the processing in FIG. 8 with reference to FIG. 9C. Firstly, based on the selected sel_size (315 in the example of FIG. 9C), the block code length (315−20+23=318) in a case where the value of QP of the pixel group of the pixel group number 0 is made smaller by 1 is calculated, and compared with the target code amount (360). If the calculated block code length is less than or equal to the target code amount, a block code length for a case where the QP of the subsequent pixel group number 1 is made smaller by 1 is calculated, and compared with the target code amount similarly. The block code length of the pixel group number 1 calculated here is (318−26+28=320), which is smaller than the target code amount. In this fashion, block code lengths are calculated by selecting pixel groups in order as follows.

Pixel group number 2: 320−26+29=323
Pixel group number 3: 323−21+24=326
Pixel group number 4: 326−22+25=329
Pixel group number 5: 329−20+22=331
Pixel group number 6: 331−18+18=331
Pixel group number 7: 331−18+21=334
Pixel group number 8: 334−20+22=336
Pixel group number 9: 336−20+24=340
Pixel group number 10: 340−19+23=344
Pixel group number 11: 344−15+18=347
Pixel group number 12: 347−13+17=351
Pixel group number 13: 351−16+19=354
Pixel group number 14: 354−17+21=358
Pixel group number 15: 358−17+20=361

In the foregoing calculated block code length, a block code length of a pixel group number 15 exceeds the target code amount. Accordingly, this processing terminates at this point in time. Specific values of QPdpcm decided in this way are illustrated in thick frames in FIG. 9C. In FIG. 9C, the QPs corresponding to the code lengths surrounded in bold lines represent the QPdpcm that the QP deciding unit 116 decided for each pixel group. For each value of the QPdpcm of a pixel group unit, pg_qp[0-14] is 1 and pg_qp[15] is 2. In this way, the block code lengths that combine the QP values become 358 bits, but processing is performed to add padding bits in the multiplexing unit 123 of a subsequent stage for bits that are insufficient with respect to the target code amount 360 bits. The generated QPdpcm which becomes the candidate application QP is output from the QP deciding unit 116 and input to the DPCM-mode-fixed determination unit 117.

<Operation of the DPCM-Mode-Fixed Determination Unit>

Next, explanation is given for operation of the DPCM-mode-fixed determination unit 117. The DPCM-mode-fixed determination unit 117 determines whether or not to use the second encoding mode that fixes DPCM for an encoding block unit. Also, it decides the application QP that the encoding unit 111E of the actual encoding system 120 uses to either of the QPalt and the QPdpcm input respectively from the QP deciding units 115 and 116 based on the result of that determination.

FIG. 11 is a flowchart that illustrates an example of processing that the DPCM-mode-fixed determination unit 117 executes. The DPCM-mode-fixed determination unit 117 inputs the QPalts and the QPdpcms that the QP deciding units 115 and 116 decided, totals the values of QPalts assigned to each pixel group included in one encoding block, and totals the values of QPdpcms assigned to each pixel group included in one encoding block. Then by comparing these total values it determines whether or not to perform encoding each pixel group included in one encoding block with DPCM fixed.

Specifically, the DPCM-mode-fixed determination unit 117 first initializes a parameter pg which indicates a pixel group to 0 in step S1101. Next, in step S1102, it initialize SumQPalt which indicates a total value of the QPalts that the QP deciding unit 115 outputs to 0, and in step S1103, it initializes SumQPdpcm which indicates a total value of QPdpcm which the QP deciding unit 116 outputs to 0. Next, transition is made to step S1104, and it is determined whether or not the value of the current pg is greater than MAX_PG which indicates a maximum value of pixel group numbers. In the present embodiment, MAX_PG=15. Here, if the value of pg is larger than this maximum value (YES in step S1104), transition is made to step S1108. On the other hand, if the value of pg is less than or equal to this maximum value (NO in step S1104), transition is made to step S1105.

In step S1105 the value of SumQPalt is updated by adding the QP of the pixel group corresponding to the current value of pg: pg_qp[pg] among the QPalts that the QP deciding unit 115 output to the value of SumQPalt. For example, if pg=0 in FIG. 9B, pg_qp[0]=2, and so the value of SumQPalt is updated from 0 to 2. Next, in step S1106 the value of SumQPdpcm is updated by adding the QP of the pixel group corresponding to the current value of pg: pg_qp[pg] among the QPdpcms that the QP deciding unit 116 output to the value of SumQPdpcm. For example, if pg=0 in FIG. 9C, pg_qp[0]=1, and so the value of SumQPdpcm is updated from 0 to 1. After that transition is made to step S1107, the value of pg to be selected for the next pixel group is update by 1, and the processing returns to step S1104. Hereinafter, processing for updating the value of SumQPalt and the value of SumQPdpcm is repeated until the value of pg exceeds a maximum value.

If the value of pg is determined to be larger than the maximum value in step S1104 and transition is made to step S1108, the total values of 16 pixel group's worth of QPs from step S1105 and in step S1106 are compared in step S1108. Here if the value of SumQPdpcm is greater than or equal to the value of SumQPalt (NO in step S1108), transition is made to step S1109, and if the value of SumQPdpcm is smaller than the value of SumQPalt (YES in step S1108), transition is made to step S1110. In step S1109, the DPCM-mode-fixed flag is set to be disabled (all_dpcm_flg=0). In step S1110, the DPCM-mode-fixed flag is set to be enabled (all_dpcm_flg=1).

Next, in step S1111, the foregoing DPCM-mode-fixed flag that is set, and, as application QPs, the QPs output by whichever one of the QP deciding units 115 and 116 accords with the setting value of that flag are output to the encoding unit 111E and the multiplexing unit 123 of the actual encoding system 120. In this way, it is possible to select an encoding mode from the first encoding mode in which PCM/DPCM can be mixed, and the second encoding mode in which DPCM is fixed so that the total value of the QPs becomes smaller.

In FIG. 11, blocks are determined so that the total of the output QPs from the QP deciding units 115 or 116 becomes smaller. This determination processing determines whichever of the first encoding mode and the second encoding mode uses finer quantization steps. The QPs are a numerical values assigned as parameters representing respective quantization steps, assignment is made in the present embodiment so that the smaller the value of the quantization step, the smaller the QP becomes. Thus the total of the QPs being small means that small quantization steps are assigned more.

In this way, the total value of QPs of the encoding block can be used as an indicator that indicates a level of a degradation of image quality ascribable to a quantization error for a source image. This total value being small means that the level of the degradation of image quality is lower, and thus it is possible to decide an encoding scheme having low degradation of image quality. In step S1108, if the value of SumQPdpcm and the value of SumQPalt match, the DPCM-mode-fixed flag is disabled to prioritize the first encoding mode, but the DPCM-mode-fixed flag may be enabled to prioritize the second encoding mode conversely.

In the foregoing example of FIG. 9B and FIG. 9C, the total value of the QPalts for the encoding mode in which PCM/DPCM are mixed is 42, and the total value of the QPdpcms of the encoding mode that fixes DPCM is 17. Thus, in the actual encoding system 120 in the subsequent stage, encoding each pixel group included in one encoding block is performed in DPCM-mode-fixed.

As described above, the provisional encoding system 110 of the present embodiment decides whether or not all pixel groups included in one encoding block are encoded by a DPCM scheme in accordance with a portion of a number of bits for header information that occupies a total amount of encoded data. Thus, it is possible to perform bit-assignment that is appropriate for the image data, and coding efficiency improves.

<Explanation of Operation of the Actual Encoding System>

Next, explanation is given for operation of the actual encoding system 120 of FIG. 1A and FIG. 1B. The same image data is inputted into the actual encoding system 120 as the image data that is inputted into the provisional encoding system 110, but it is necessary to wait until the DPCM-mode-fixed determination unit 117 of the provisional encoding system 110 decides and outputs the application QP and the DPCM-mode-fixed flag. Thus, the input image data is input into the delay unit 121, and a delay of a predetermined number of processing cycles worth that is necessary for the provisional encoding system 110 to decide the application QP and the DPCM-mode-fixed flag is performed. The image data after the delay is outputted from the delay unit 121 to the encoding unit 111E. With this, the encoding unit 111E can encode the encoding block, for which the provisional encoding system 110 decided the application QP, using that decided application QP.

The encoding unit 111E has the same configuration as the encoding unit 111 illustrated in FIG. 3, and uses the application QP to perform actual encoding of the delayed image data. With this, code data of a code length that is the same as the block code length that the QP deciding unit 115 or 116 decided is generated, and output to the multiplexing unit 123 together with the PCM/DPCM selection flag and the selected code length. In the multiplexing unit 123, the code data, the selected code length and the PCM/DPCM selection flag from the encoding unit 111E, and the QP and the DPCM-mode-fixed flag from the DPCM-mode-fixed determination unit 117 are inputted, and multiplexing is performed in accordance with a predetermined format for each encoding block. The multiplexing unit 123 generates encoded data by performing multiplexing in accordance with the format of either FIG. 10B or FIG. 10C described below in accordance with the value of the DPCM-mode-fixed flag, and outputs it.

Hereinafter, explanation is given with reference to FIG. 10A to 10C for an example of formats for encoded data corresponding to embodiments of the invention. FIG. 10A is a view that represents an example of a data structure of an encoding format, and a numerical value indicated by parentheses represents the number of bits of data stored in each region. FIG. 10A illustrates a format in which values of QP assigned to each pixel group of the encoding block and PCM/DPCM flag information is stored for all pixel groups. Encoded data 1001 (360 bits) of the whole of the block is configured from a header portion 1002 (48 bits) and a pixel data portion 1003 (312 bits). The header portion 1002 is comprised by a QP value portion 1004 (32 bits) that stores values of QP, and a flag portion 1005 (16 bits) that stores PCM/DPCM selection flags. Sixteen 2-bit QPs (1004_0-1004_f) are stored for each pixel group in the QP value portion 1004. Sixteen 1-bit flag values for the PCM/DPCM selection flag (1005_0-1505_f) for each pixel group are stored in the flag portion 1005. The number of pixels worth (3×16=48 pixel's worth) of code data is stored in the pixel data portion 1003.

In contrast to such a format, a format is illustrated in FIG. 10B in which the size of the header portion is made to be smaller, enabling allocation of a pixel data portion of a size that is that much larger. Firstly, for a set of application QPs illustrated in FIGS. 9B and C, the same QP is assigned for some of pixel groups that are consecutive that includes the head of the pixel groups, and a different QP is assigned for the remaining pixel groups. Also, a QP change is 1 step. Based on this property, it is not necessary to maintain values of all QPs included in the encoding block in the encoding format corresponding to the present embodiment. Instead, information of the head QP (pixel group number: 0), and a pixel group number indicating the position at which the QP switches is included in the header portion. As one example, it is assumed that the head QP is indicated by qp0, and the pixel group number at which the QP changes by qp_pos. Also, above, the head QP, that is the lowest QP, was made to be the QP value that should be stored, but the same effect can be achieved in the case where it is made to be the maximum QP that is assigned. This is because even in such a case, it is possible to reproduce a correct QP assignment if the switching positions can be identified. Also, in the present embodiment, it becomes possible to make the size of the header portion even smaller in accordance with the value of the DPCM-mode-fixed flag. Below, explanation is given with reference to FIG. 10B and FIG. 10C of an example of an encoding format corresponding to the present embodiment.

First, FIG. 10B is a view that illustrates an example of a data structure of an encoding format for a case in which the DPCM-mode-fixed flag indicates that it is disabled (0). Encoded data 1011 (360 bits) of the whole of the block is configured from a header portion 1012 (23 bits) and a pixel data portion 1013 (337 bits). The header portion 1012 is comprised by a QP value portion 1014 (7 bits) that stores values of QPs, and a flag portion 1015 (16 bits) that stores PCM/DPCM selection flags. In the QP value portion 1014, 2 bits (1016) for qp0, 4 bits for qp_pos (1017), and 1 bit for the DPCM-mode-fixed flag (1018) are stored. In the example of FIG. 9B, the values (2, 6, 0) are stored. Sixteen 1-bit flag values for the PCM/DPCM selection flags (1015_0-1015_f) for each pixel group are stored in the flag portion 1015. The number of pixels worth (3×16=48 pixel's worth) of code data as variable-length code is stored in the pixel data portion 1013. The encoded data 1011 which is multiplexed is outputted as stream data to an output terminal 102, and is outputted to image memory or a bus interface (not shown). With the format of FIG. 10B, it becomes possible to reduce the size of the header portion by 25 bits compared to the format of FIG. 10A and to distribute that amount to the pixel data portion.

Next, FIG. 10C is a view that illustrate and example of a data structure of an encoding format for a case in which the DPCM-mode-fixed flag indicates that it is enabled (1). Encoded data 1021 (360 bits) of the whole of the block is configured from a header portion 1022 (7 bits) and a pixel data portion 1023 (353 bits). The flag portion storing the PCM/DPCM selection flag is unnecessary for the header portion 1022, and 2 bits (1024), 4 bits (1025) and 1 bit (1026) are stored for qp0, qp_pos and the DPCM-mode-fixed flag respectively. In the example of FIG. 9C, the values (1, 15, 1) are stored. The number of pixels worth (3×16=48 pixel's worth) of code data as variable-length code is stored in the pixel data portion 1023. The encoded data 1021 which is multiplexed is outputted as stream data to an output terminal 102, and is outputted to image memory or a bus interface (not shown). By the format of FIG. 10C the header portion further becomes 16 bits smaller compared to the format of FIG. 10B because the 1 bit flag value for the PCM/DPCM selection flag for each pixel group becomes unnecessary. Compared to FIG. 10A, the header portion becomes 41 bits smaller and that amount can be distributed to the pixel data portion.

In this way, in the present embodiment, omitting 16 bits worth of the bit field of the PCM/DPCM selection flag is made possible by introducing 1 bit flag information indicating that all of the pixel groups of the encoding block are encoded fixedly by DPCM. The result of this is that it becomes possible to increase the number of bits assigned for the pixel data portion in the target code amount, and depending on the input image, the effect of reducing a degradation of image quality can be obtained because it becomes possible to encode with smaller QPs than the QPalts decided by the QP deciding unit 115. In particular, in a natural image such as one of a person or a landscape, the spatial correlation between pixels is high, and level portions are more dominant as image data than sharp edge portions, and generally compression efficiency is higher when encoding using DPCM. For this reason, by using an encoding format such as is described above, in addition to increasing the number of bits assigned to the image data in a case of all DPCM prediction, it is possible to further switch to a precise prediction mode at edge portion vicinities.

(Explanation of Image Decoding Unit)

Next, explanation is given for an example configuration and operation of an image decoding unit that corresponds to an embodiment of the invention and that decodes encoded data generated in the image encoding unit 20. FIG. 2 is a block diagram for illustrating an example configuration of an image decoding unit 40 corresponding to an embodiment of the invention. The image processing apparatus 100 has the image decoding unit 40, and can decode encoded data stored in the memory 30 thereby. Hereinafter, explanation is given for operation of each block in an example configuration of the image decoding unit of the present embodiment.

The image decoding unit 40 illustrated in FIG. 2 is comprised by a demultiplexing unit 203, a variable length decoding unit 204, an adder 205, a selector 206, an inverse quantization unit 207, and a prediction unit 208. The image decoding unit 40 may be configured integrally in hardware using memory, logic circuits and dedicated devices, or may be configured by distributing among a plurality of devices. Alternatively, they may be configured in software by a computer such as a CPU executing a processing program stored in a memory.

For the image decoding unit 40, stream data generated by the image encoding unit 20 is input into the demultiplexing unit 203 via an input terminal 201 by way of an image memory (not shown), a bus interface or the like. The demultiplexing unit 203 decodes the inputted stream data in accordance with a predetermined format, separates information of a QP, a PCM/DPCM selection flag and the code data, and outputs sequentially for each processing cycle. Also, the demultiplexing unit 203, if the DPCM-mode-fixed flag in the header indicates that it is disabled (value of 0), sequentially outputs values that the PCM/DPCM selection flags that are multiplexed thereafter indicate. On the other hand, if the DPCM-mode-fixed flag in the header indicates that it is enabled (value of 1), the demultiplexing unit 203 outputs a value indicating the DPCM mode as the PCM/DPCM selection flag for all pixels of this block. The QP is outputted to the inverse quantization unit 207 and a quantization unit 210, and the PCM/DPCM selection flag is outputted to the selector 206. From the code data, PCM data is outputted to the selector 206, and DPCM data is outputted to the variable length decoding unit 204. The variable length decoding unit 204 performs variable-length decoding of inputted DPCM data, and outputs decoded DPCM data to the adder 205. The adder 205 obtains a decoding value by adding a prediction value from the prediction unit 208 which is explained later to the decoded DPCM data, and outputs to the selector 206.

The selector 206 switches PCM data from the demultiplexing unit 203 and a decoding value from the adder 205 in accordance with the PCM/DPCM selection flag, and outputs as quantization data, outputting to the inverse quantization unit 207. The inverse quantization unit 207 uses the QP value to inverse quantize the quantization data from the selector 206 to generate decoded image data, and outputs to the prediction unit 208 and an output terminal 202. The prediction unit 208 is configured by a pixel delay unit 209 and the quantization unit 210. Decoded image data inputted from the inverse quantization unit 207 is delayed by a color component's worth in the pixel delay unit 209, quantized in the quantization unit 210, and output as a prediction value so that the previous value of the same color component becomes the prediction value. Note that because no previous pixel exists for the first pixel of the encoding block of each color component, a value of 0 is outputted as the prediction value. Decoded image data outputted from the inverse quantization unit 207 is outputted to the outside via the output terminal 202.

As explained above, to perform encoding of a fixed length for each encoding target encoding block consisting of a plurality of pixel groups, first provisional encoding is performed with a plurality of QPs in the provisional encoding system to obtain encoded data amounts, and then the values of QP to apply to pixel group units are decided in accordance with those encoded data amounts. A configuration is taken such that next, in the actual encoding system, actual encoding is performed using the application QPs that are decided. With this, it is possible to decide the value of the QP of each pixel group so that the block code length of an encoding block becomes a maximum value that does not exceed the predetermined value.

Also, encoded data formats are defined separately for those that correspond to the first encoding mode which switches PCM/DPCM in pixel group units, and for those that correspond to the second encoding mode which fixedly encodes all pixel groups by DPCM. Configuration is taken so that based on these encoding formats, QPs to apply to the actual encoding system are obtained for each of the first encoding mode and the second encoding mode, and the modes whose QP total is smaller is selected. With this, efficient encoding while reducing a quantization error in an encoding block unit to suppress a degradation of image quality becomes possible.

Also, in the present embodiment, even if the differential between adjacent pixels becomes large, the code length is not forcibly made to be halved from 10 bits to 5 bits in the case of PCM encoding as in Japanese Patent Laid-Open No. 2010-004514. Instead, the shorter code length in the PCM and DPCM encoding results is selected for each pixel group using a plurality of quantization steps set in a stepwise fashion including a quantization step 1. Furthermore, in the present embodiment, the quantization step is selected considering the block code length of the encoding block and not only the code length of a group unit. With this, even if the code length becomes larger in some of pixel groups, this is accordingly cancelled out if the code length of another pixel group is smaller. Thus, even if a sharp edge is included within an encoding block and a large code length is expended by that edge component, if before and after the edge is level, the code length of that edge will be absorbed thereby. As a result, there ceases to be a need to reduce bits unnecessarily as in Japanese Patent Laid-Open No. 2010-004514 when encoding edge components.

In embodiments of the above-described invention, the number of bits of image data is not limited to 10 bits, and a different number of bits such as 8 bits or 12 bits may be used. Also, the block size is not limited to 16 horizontal pixels×1 vertical pixel, and may be any size. For example, it may be made to be a two-dimensional structure such as 4 horizontal pixels×4 vertical pixels.

Furthermore, the format of the encoding target image data is not limited to RGB image data, and may be an image data format such as one for gray-scale images, or for color images, YCbCr or Bayer array data. FIG. 4B illustrates a relationship between pixel groups and pixel data that configures encoding blocks in a case where the image data format is YCbCr4:2:2 with a luminance signal (Y) and two color-difference signals (Cr, Cb). In FIG. 4B, an example is illustrated in which a total of 4 pixels—2 pixels for Y and 1 pixel each for Cb and Cr—is made to be a unit pixel group, and an encoding block is configured from 4×8=32 pixels. Here, the number of pixel groups included in an encoding block may be more than 8 groups. FIG. 4C illustrates a relationship between pixel groups and pixel data that configures encoding blocks in a case where the image data format is a Bayer arrangement. In FIG. 4C, an example is illustrated in which a total of 4 pixels—2 pixels for G and 1 pixel each for R and B—is made to be a unit pixel group, and an encoding block is configured from 4×8=32 pixels. Here, the number of pixel groups included in an encoding block may be more than 8 groups. For a gray-scale image, it is possible to configure a pixel group from a set of adjacent pixels among the pixels that configure the gray-scale image (not shown). In such a case, it is possible to include adjacent pixels, for example 3 pixels or 4 pixels, in a unit pixel group.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-092370, filed Apr. 28, 2015, which is hereby incorporated by reference herein in its entirety.

What is claimed is:

1. An image processing apparatus comprising:
an acquiring unit configured to acquire an encoding target block having a plurality of groups each including a predetermined number of pixels;
a deciding unit configured to decide for each group a quantization parameter used to quantize image data of the group and an encoding scheme so that a code length of the encoding target block does not exceed a predetermined value,
wherein the deciding unit selects, as the encoding scheme of a respective group, either a first encoding scheme that outputs quantized image data or a second encoding scheme that outputs encoded data of a differential between quantized image data and prediction data;
an encoding unit configured to generate encoded data by encoding image data of the encoding target block in accordance with the quantization parameters and the encoding schemes decided for the respective groups by the deciding unit; and
a multiplexing unit configured to generate stream data by multiplexing encoded data of the encoding target block outputted from the encoding unit and header information including first information for identifying an encoding mode,
wherein the deciding unit assigns, as the quantization parameter of the respective group, either a first quantization parameter or a second quantization parameter corresponding to a quantization step smaller than a quantization step corresponding to the first quantization parameter, out of the plurality of quantization parameters,
wherein the deciding unit selects as the encoding mode of the encoding target block either a first mode that compares, for each group, a code length obtained from encoding according to the first encoding scheme with a code length obtained from encoding according to the second encoding scheme and selects, for each group, whichever of the first encoding scheme and the second encoding scheme can obtain a smaller code length, or a second mode that selects the second encoding scheme as the encoding scheme of all groups of the encoding target block, and decides the quantization parameters and the encoding schemes of the plurality of groups of the encoding target block in accordance with the selected encoding mode,
wherein the multiplexing unit multiplexes the header information which includes second information for identifying the encoding scheme of each of the plurality of groups of the encoding target block if the deciding unit selects the first mode, and multiplexes the header information which does not include the second information if the deciding unit selects the second mode, and
wherein the deciding unit in the first mode decides the quantization parameters and the encoding schemes of the groups so that the code length of the encoding target block does not exceed a first value, and in the second mode decides the quantization parameters and the encoding schemes of the groups so that the code length of the encoding target block does not exceed a second value larger than the first value.

2. An apparatus according to claim 1, wherein
the deciding unit selects whichever of the first mode and the second mode has a smaller total of quantization parameters assigned to the plurality of groups of the encoding target block.

3. An apparatus according to claim 1, wherein
a bit length of the second information is the same as a difference between the first value and the second value.

4. An apparatus according to claim 1, wherein
the deciding unit assigns the second quantization parameter to some of the groups of the encoding target block, and assigns the first quantization parameter to others of the groups, and
the header information includes information indicating either the first quantization parameter or the second quantization parameter, and information indicating a switching position between the some of the groups and the others of the groups.

5. An apparatus according to claim 1, wherein
the deciding unit decides, as the first quantization parameter, one of the plurality of quantization parameters so that a code length of encoded data of the encoding target block generated by quantizing all of the groups of the encoding target block using the first quantization parameter, and encoding using the encoding schemes decided for the respective groups does not exceed the predetermined value, and becomes a maximum value, and assigns the second quantization parameter to some of the groups of the encoding target block.

6. An apparatus according to claim 5, wherein
the deciding unit decides the some of the groups so that a total of a first total and a second total does not exceed the predetermined value, and becomes a maximum value,
wherein the first total is a total of code lengths of encoded data generated by quantizing the some of the groups of the encoding target block using the second quantization parameter, and encoding each of the some of the groups using the encoding schemes decided for each of the some of the groups, and
the second total is a total of code lengths of encoded data generated by quantizing others of the groups using the first quantization parameter, and encoding each of the others of the groups using the encoding schemes decided for each of the others of the groups.

7. An apparatus according to claim 5, wherein
the deciding unit assigns the second quantization parameter as the quantization parameter of at least a head group out of the plurality of groups of the encoding target block.

8. An apparatus according to claim 7, wherein
the deciding unit assigns the second quantization parameter for a plurality of consecutive groups including the head group out of the plurality of groups of the encoding target block.

9. An apparatus according to claim 8, wherein
the deciding unit assigns the first quantization parameter for groups other than the plurality of consecutive groups including the head group out of the plurality of groups of the encoding target block.

10. An apparatus according to claim 5, wherein
the deciding unit further decides one of the plurality of quantization parameters as a third quantization parameter, so that a code length of encoded data of the encoding target block does not exceed the predetermined value and becomes a maximum value,
wherein the encoded data is generated by:
quantizing a first group of the encoding target block using the second quantization parameter;
quantizing a second group using the third quantization parameter corresponding to a quantization step smaller than that of the second quantization parameter;
quantizing the other groups using the first quantization parameter; and
encoding each group using the respective encoding schemes decided for each group.

11. An apparatus according to claim 1, wherein
the second quantization parameter is a quantization parameter corresponding to a quantization step that is next largest after the first quantization parameter out of the plurality of quantization parameters.

12. An apparatus according to claim 1, wherein
in the plurality of quantization parameters, a quantization result becomes 1 bit smaller if the quantization parameter increases by 1.

13. An apparatus according to claim 1, wherein
the image data includes pixels of a plurality of colors and the groups include pixels of different colors.

14. An image processing method comprising:
acquiring an encoding target block having a plurality of groups each including a predetermined number of pixels;
deciding for each group a quantization parameter used to quantize image data of the group and an encoding scheme so that a code length of the encoding target block does not exceed a predetermined value,
wherein the deciding selects, as the encoding scheme of a respective group, either of a first encoding scheme that outputs quantized image data or a second encoding scheme that outputs encoded data of a differential between quantized image data and prediction data;
generating encoded data by encoding image data of the encoding target block in accordance with the quantization parameters and the encoding schemes decided for the respective groups by the deciding; and
generating stream data by multiplexing encoded data of the encoding target block outputted from the encoding unit and header information including first information for identifying an encoding mode,
wherein the deciding assigns, as the quantization parameter of the respective group, either a first quantization parameter or a second quantization parameter corresponding to a quantization step smaller than a quantization step corresponding to the first quantization parameter, out of the plurality of quantization parameters,
wherein the deciding selects as the encoding mode of the encoding target block either a first mode that compares, for each group, a code length obtained from encoding according to the first encoding scheme with a code length obtained from encoding according to the second encoding scheme and selects, for each group, whichever of the first encoding scheme and the second encoding scheme can obtain a smaller code length, or a second mode that selects the second encoding scheme as the encoding scheme of all groups of the encoding target block, and decides the quantization parameters and the encoding schemes of the plurality of groups of the encoding target block in accordance with the selected encoding mode,
wherein in the generating stream data, the header information which includes second information for identifying the encoding scheme of each of the plurality of groups of the encoding target block is multiplexed if the deciding selects the first mode, and the header information which does not include the second information is multiplexed if the deciding unit selects the second mode, and
wherein in the deciding, in the first mode, the quantization parameters and the encoding schemes of the groups are decided so that the code length of the encoding target block does not exceed a first value, and in the second mode, the quantization parameters and the encoding schemes of the groups are decided so that the code length of the encoding target block does not exceed a second value larger than the first value.

* * * * *